(12) United States Patent
Dong et al.

(10) Patent No.: US 12,366,766 B2
(45) Date of Patent: Jul. 22, 2025

(54) GRATING REGULATING DEVICE AND DISPLAYING DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventors: Zhao Dong, Beijing (CN); Ru Zhou, Beijing (CN); Hu Li, Beijing (CN); Baoman Li, Beijing (CN); Jianghui Zhan, Beijing (CN)

(73) Assignees: Hefei BOE Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/274,813

(22) PCT Filed: Aug. 30, 2022

(86) PCT No.: PCT/CN2022/115925
§ 371 (c)(1),
(2) Date: Jul. 28, 2023

(87) PCT Pub. No.: WO2023/142476
PCT Pub. Date: Aug. 3, 2023

(65) Prior Publication Data
US 2025/0022393 A1   Jan. 16, 2025

(30) Foreign Application Priority Data

Jan. 26, 2022 (CN) .......................... 202210093757.4

(51) Int. Cl.
*G02B 30/31* (2020.01)
*G02F 1/1343* (2006.01)
(Continued)

(52) U.S. Cl.
CPC ....... *G02B 30/31* (2020.01); *G02F 1/134309* (2013.01); *G02F 1/13452* (2013.01);
(Continued)

(58) Field of Classification Search
CPC .... G02B 30/31; G02B 30/40; G02B 27/0093; G02B 30/25; G02F 1/292; G02F 1/133;
(Continued)

(56) References Cited

U.S. PATENT DOCUMENTS

2014/0063385 A1   3/2014   Yang
2014/0126029 A1   5/2014   Fuetterer
(Continued)

FOREIGN PATENT DOCUMENTS

CN   202306062 U   7/2012
CN   102662283 A   9/2012
(Continued)

OTHER PUBLICATIONS

English translation of CN107577092A (Year: 2018).*
Non-Final Office Action dated Mar. 11, 2024, issued in U.S. Appl. No. 18/283,953 (12 pages).

*Primary Examiner* — Nelson M Rosario
(74) *Attorney, Agent, or Firm* — WHDA, LLP

(57) ABSTRACT

A grating regulating device includes: a first substrate, a conductive layer, a dielectric layer and a second substrate arranged in stack, the conductive layer includes a wiring layer, a first insulating layer and a first electrode layer arranged in stack, the wiring layer includes a plurality of driving lines, and the first electrode layer includes a plurality of sub-electrodes arranged in a first direction. The driving lines are for transmitting a driving signal to the sub-electrodes, and the sub-electrodes are for, by the effect of the driving signal, driving corresponding positions of the dielectric layer to be light-transmitting or opaque. The grating
(Continued)

regulating device includes a grating region including a plurality of common-signal units, each of the common-signal units includes at least one grating unit, the grating unit includes a plurality of sub-electrodes, and the plurality of sub-electrodes located in the same grating unit are connected to different driving lines.

18 Claims, 13 Drawing Sheets

(51) Int. Cl.
   *G02F 1/1345* (2006.01)
   *G09G 3/00* (2006.01)
   *G06F 3/01* (2006.01)
(52) U.S. Cl.
   CPC .............. *G09G 3/003* (2013.01); *G06F 3/013* (2013.01); *G09G 2354/00* (2013.01)
(58) Field of Classification Search
   CPC ...... G02F 1/1335; G02F 1/1343; G06F 3/013; H04N 13/31; H04N 13/376; H04N 13/04
   See application file for complete search history.

(56) References Cited

U.S. PATENT DOCUMENTS

| | | | |
|---|---|---|---|
| 2017/0108701 A1 | 4/2017 | Wu et al. | |
| 2019/0335163 A1 | 10/2019 | Yang et al. | |
| 2019/0353915 A1 | 11/2019 | Zhang et al. | |
| 2020/0183182 A1* | 6/2020 | Yang | G02F 1/292 |
| 2022/0229335 A1 | 7/2022 | Kroll et al. | |
| 2024/0322429 A1* | 9/2024 | Suzuki | G02F 1/134309 |

FOREIGN PATENT DOCUMENTS

| | | | |
|---|---|---|---|
| CN | 102710956 A | | 10/2012 |
| CN | 103048835 A | | 4/2013 |
| CN | 103197474 A | | 7/2013 |
| CN | 103852926 A | | 6/2014 |
| CN | 103995402 A | | 8/2014 |
| CN | 104020625 A | | 9/2014 |
| CN | 206057761 U | | 3/2017 |
| CN | 106918956 A | | 7/2017 |
| CN | 107577092 A | * | 1/2018 |
| CN | 108572489 A | | 9/2018 |
| CN | 108873362 A | | 11/2018 |
| CN | 110095871 A | | 8/2019 |
| CN | 211128026 U | | 7/2020 |
| CN | 114488373 A | | 5/2022 |
| DE | 102012104900 A1 | | 12/2012 |
| EP | 3040759 A1 | | 7/2016 |
| TW | 201107789 A | | 3/2011 |
| WO | 2012/164893 A1 | | 12/2012 |

* cited by examiner

GRATING REGULATING DEVICE AND DISPLAYING DEVICE

CROSS REFERENCE TO RELEVANT APPLICATIONS

The present disclosure claims the priority of the Chinese patent application filed on Jan. 26, 2022 before the China National Intellectual Property Administration with the application number of 202210093757.4 and the title of "GRATING REGULATING DEVICE AND DISPLAYING DEVICE", which is incorporated herein in its entirety by reference.

TECHNICAL FIELD

The present disclosure relates to the technical field of displaying, and particularly relates to a grating regulating device and a displaying device.

BACKGROUND

With the development and progress in science and technology, the Three-Dimensional (3D) displaying technique has become a hot research field. Most of the conventional 3D displaying devices require the user to wear 3D glasses to watch, which is very troublesome and results in a poor user experience. Therefore, naked-eye 3D displaying devices, which can reach the effect of 3D displaying without wearing 3D glasses, have been paid attention to.

SUMMARY

The present disclosure provides a grating regulating device, wherein the grating regulating device comprises:
- a first substrate, a conductive layer, a dielectric layer and a second substrate that are arranged in stack, wherein the conductive layer comprises a wiring layer, a first insulating layer and a first electrode layer that are arranged in stack, the wiring layer comprises a plurality of driving lines, and the first electrode layer comprises a plurality of sub-electrodes that are arranged in a first direction;
- each of the plurality of driving lines is connected to a signal inputting terminal and one of the plurality of sub-electrodes, to transmit a driving signal inputted by the signal inputting terminal to the sub-electrodes, and the sub-electrodes are for, by the effect of the driving signal, driving corresponding positions of the dielectric layer to be light-transmitting or opaque;
- the grating regulating device comprises a grating region, the grating region comprises a plurality of common-signal units, each of the plurality of common-signal units comprises at least one grating unit, the grating unit comprises the plurality of sub-electrodes, and the plurality of sub-electrodes located in the same grating unit are connected to different driving lines; and
- the plurality of sub-electrodes located in the same grating unit are ordered in the first direction, and the sub-electrodes that are located in a same common-signal unit and have a same serial number are connected to a same driving line.

In some alternative embodiments, in the grating region, the plurality of driving lines are arranged in a second direction, and orthographic projections of the plurality of driving lines on the first substrate and orthographic projections of the plurality of sub-electrodes on the first substrate intersect with each other.

In some alternative embodiments, each of the plurality of common-signal units comprises a plurality of grating units, and each of the plurality of driving lines comprises a plurality of first switching patterns; and
- the plurality of sub-electrodes that are located in a same common-signal unit and have a same serial number are connected to different first switching patterns in a same driving line by via holes.

In some alternative embodiments, the wiring layer further comprises at least one auxiliary line, the auxiliary line is insulated from the sub-electrodes, and in the grating region, the at least one auxiliary line is arranged in the second direction.

In some alternative embodiments, the auxiliary line is parallel to the driving lines in the grating region; and/or
- the auxiliary line is located between at least two neighboring driving lines; and/or
- a plurality of auxiliary lines are located on two opposite sides of the plurality of driving lines; and/or
- the plurality of common-signal units comprise neighboring first common-signal unit and second common-signal unit, a plurality of driving lines that are connected to the first common-signal unit are a first wiring unit, a plurality of driving lines that are connected to the second common-signal unit are a second wiring unit, and the auxiliary line is located between the first wiring unit and the second wiring unit.

In some alternative embodiments, the auxiliary line and the driving lines located on one side of the auxiliary line have same patterns in the grating region.

In some alternative embodiments, the auxiliary line is connected to a constant-voltage inputting terminal, and the constant-voltage inputting terminal is for transmitting a constant-voltage signal to the auxiliary line.

In some alternative embodiments, the plurality of common-signal units include a third common-signal unit and a fourth common-signal unit, a plurality of driving lines that are connected to the third common-signal unit are a third wiring unit, and a plurality of driving lines that are connected to the fourth common-signal unit are a fourth wiring unit:
- the driving lines of the third wiring unit comprise a plurality of second switching patterns, the plurality of second switching patterns located on the third wiring unit and the plurality of first switching patterns located on the fourth wiring unit are of a translation relation in the second direction, and the second switching patterns are insulated from the sub-electrodes: and
- the driving lines of the fourth wiring unit comprise a plurality of third switching patterns, the plurality of third switching patterns located on the fourth wiring unit and the plurality of first switching patterns located on the third wiring unit are of a translation relation in the second direction, and the third switching patterns are insulated from the sub-electrodes.

In some alternative embodiments, the first electrode layer comprises a first sub-electrode layer, a second insulating layer and a second sub-electrode layer that are arranged in stack, and the first sub-electrode layer is located between the first insulating layer and the second insulating layer;
- the plurality of sub-electrodes include a plurality of first sub-electrodes that are arranged in the first direction, and a plurality of second sub-electrodes that are arranged in the first direction, and orthographic projections of the first sub-electrodes on the first substrate and orthographic projections of the second sub-electrodes on the first substrate are alternately arranged;

the plurality of first sub-electrodes are located at the first sub-electrode layer, the first sub-electrodes and the driving lines are connected by first via holes provided in the first insulating layer, the plurality of second sub-electrodes are located at the second sub-electrode layer, and the second sub-electrodes and the driving lines are connected by second via holes provided in the first insulating layer and the second insulating layer; and each of the first sub-electrodes comprises a bent part, and the bent part is bent toward one side away from the second via hole, to form an avoiding region for avoiding the second via hole.

In some alternative embodiments, the signal inputting terminal is located on any one side of the grating region in the first direction.

In some alternative embodiments, the grating regulating device further comprises a non-grating region located on at least one side of the grating region; and the plurality of driving lines are located in the non-grating region, and the sub-electrodes extend to the non-grating region, and are connected to the corresponding driving lines by via holes in the non-grating region.

In some alternative embodiments, the plurality of common-signal units include a fifth common-signal unit and a sixth common-signal unit, wherein the sixth common-signal unit is any one of the common-signal units that is located on one side of the fifth common-signal unit that is close to the signal inputting terminal; and an orthographic projection of the driving line connected to the fifth common-signal unit on the first substrate and an orthographic projection of at least one of the sub-electrodes in the sixth common-signal unit on the first substrate intersect with each other.

In some alternative embodiments, the plurality of common-signal units include a seventh common-signal unit and an eighth common-signal unit, wherein the eighth common-signal unit is any one of the plurality of common-signal units other than the seventh common-signal unit; and an orthographic projection of the driving line connected to the seventh common-signal unit on the first substrate and orthographic projections of the sub-electrodes in the eighth common-signal unit on the first substrate do not overlap.

In some alternative embodiments, each of the driving lines comprises an extending line and a bending line, an extension direction of the extending line is the first direction, the extending line is connected to the sub-electrodes that are located in a same common-signal unit and have a same serial number by via holes, one end of the bending line is connected to the extending line, the other end of the bending line is connected to the signal inputting terminal, and orthographic projections of the bending lines on the first substrate and orthographic projections of the plurality of sub-electrodes on the first substrate do not overlap.

In some alternative embodiments, the bending line is located on one side of the extending line that is away from the grating region.

In some alternative embodiments, a plurality of driving lines that are connected to a same common-signal unit are divided into a first wiring group and a second wiring group, and the first wiring group and the second wiring group are located on two opposite sides of the grating region.

In some alternative embodiments, the plurality of sub-electrodes include first sub-electrodes and second sub-electrodes that are alternately arranged in the first direction, the plurality of first sub-electrodes located in the same grating unit are ordered in the first direction, and the plurality of second sub-electrodes located in the same grating unit are ordered in the first direction;

the first sub-electrodes and the second sub-electrodes whose serial number is an odd number are correspondingly connected to the driving lines in the first wiring group; and the first sub-electrodes and the second sub-electrodes whose serial number is an even number are correspondingly connected to the driving lines in the second wiring group.

In some alternative embodiments, each of the sub-electrodes is connected to two driving lines, and the two driving lines are individually located in the first wiring group and the second wiring group.

In some alternative embodiments, the two driving lines connected to the same sub-electrode are connected to a same signal inputting terminal.

In some alternative embodiments, the first wiring group and the second wiring group are located at different film layers.

In some alternative embodiments, the wiring layer comprises a first wiring layer, a third insulating layer and a second wiring layer that are arranged in stack; and all of the driving lines in the first wiring group and the signal inputting terminal are located at the first wiring layer and are interconnected, the driving lines in the second wiring group are located at the second wiring layer, and the two driving lines connected to the same sub-electrode are connected by a via hole in the non-grating region.

In some alternative embodiments, the sub-electrodes extend to a first side and/or a second side of the grating region, and the signal inputting terminal is located on a third side of the grating region.

In some alternative embodiments, the interconnected driving lines and signal inputting terminal are located on a same side of the grating region, wherein the same side refers to any one side of the grating region in an extension direction of the sub-electrodes.

In some alternative embodiments, the plurality of driving lines are connected to different signal inputting terminal.

The present disclosure provides a displaying device, wherein the displaying device comprises a display panel and the grating regulating device according to any one of the above embodiments, and the grating regulating device is located on a light exiting side or shadow side of the display panel.

In some alternative embodiments, the display panel comprises a displaying region and a non-displaying region located on at least one side of the displaying region; and an orthographic projection of the grating region on a plane where the display panel is located covers the displaying region.

In some alternative embodiments, in the grating region, a plurality of driving lines are arranged in a second direction, and orthographic projections of the driving lines on the first substrate and orthographic projections of the plurality of sub-electrodes on the first substrate intersect with each other:

the displaying region comprises a plurality of pixel opening regions that are arranged in an array in a row direction and a column direction, and non-opening regions surrounding the pixel opening regions; and in the row direction, the orthographic projections of the driving lines on the plane where the display panel is located are located in areas of the pixel opening regions, or the orthographic projections of the driving lines on the plane where the display panel is located are located in areas of the non-opening regions.

In some alternative embodiments, the displaying device further comprises:

a light bar provided on the shadow side of the display panel; and all of an orthographic projection of the light bar on the plane where the display panel is located and orthographic projections of the interconnected driving lines and signal inputting terminal on the plane where the display panel is located are located on a same side of the displaying region, and the same side refers to any one side of the displaying region in an extension direction of the sub-electrodes.

The present disclosure provides a 3D displaying device, wherein the 3D displaying device comprises a display panel and the grating regulating device according to any one of the above embodiments, and the grating regulating device and the display panel face each other.

In some alternative embodiments, the 3D displaying device further comprises:

an eyeball tracking module configured to acquire a watching distance; and the grating regulating device is connected to the eyeball tracking module, and is further configured to, according to the watching distance, adjust an opening position and/or an aperture ratio of the grating unit.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work. It should be noted that the scales in the drawings are merely illustrative and do not indicate the actual scales.

In FIG. 8a to FIG. 8c.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall in the protection scope of the present disclosure.

In usage of naked-eye 3D displaying devices in the related art, if the user moves slightly, interference happens, which results in bad experience of the user such as nausea and dizziness.

The present disclosure provides a grating regulating device 100, applied to a displaying device, and the displaying device can realize 2D displaying or 3D displaying.

Figure 1:
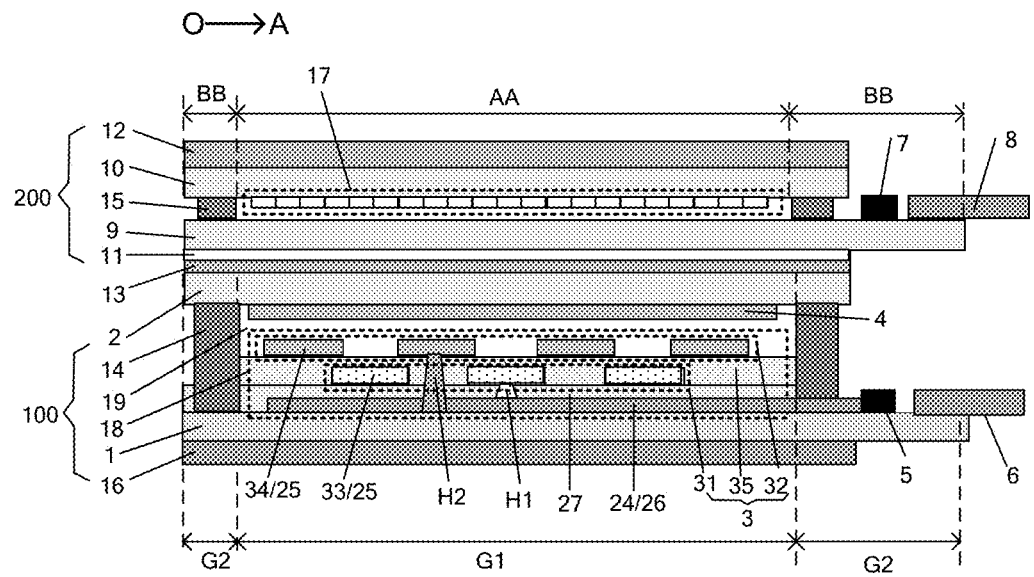
FIG. 1 is a schematic sectional structural diagram of a first type of displaying device according to an embodiment of the present disclosure.

As shown in FIG. 1, the grating regulating device 100 comprises a first substrate 1, a conductive layer 18, a dielectric layer 19 and a second substrate 2 that are arranged in stack, the conductive layer 18 comprises a wiring layer 26, a first insulating layer 27 and a first electrode layer 3 that are arranged in stack, the wiring layer 26 comprises a plurality of driving lines 24 (as shown in FIG. 11 to FIG. 15), and the first electrode layer 3 comprises a plurality of sub-electrodes 25 that are arranged in a first direction (the direction OA in the figure) (as shown in FIG. 1 and FIG. 11 to FIG. 15).

As shown in FIG. 11 to FIG. 15, the driving lines 24 are connected to a signal inputting terminal (not shown in the figures, and may be located in the region covered by the driving chip 5 in FIG. 11 to FIG. 15) and the sub-electrodes 25, to transmit a driving signal inputted by the signal inputting terminal to the sub-electrodes 25, and the sub-electrodes 25 are for, by the effect of the driving signal, driving the corresponding positions of the dielectric layer 19 to be light-transmitting or opaque.

As shown in FIG. 11 to FIG. 15, the grating regulating device 100 comprises a grating region G1, the grating region G1 comprises a plurality of common-signal units 23, each of the common-signal units 23 comprises at least one grating unit 20, the grating unit 20 comprises a plurality of sub-electrodes 25, and the plurality of sub-electrodes 25 located in the same grating unit 20 are connected to different driving lines 24.

As shown in FIG. 11 to FIG. 15, the plurality of sub-electrodes 25 located in the same grating unit 20 are ordered in the first direction (the direction OA in the figures), and the sub-electrodes 25 that are located in the same common-signal unit 23 and have the same serial number are connected to the same driving line 24.

Figure 2A:
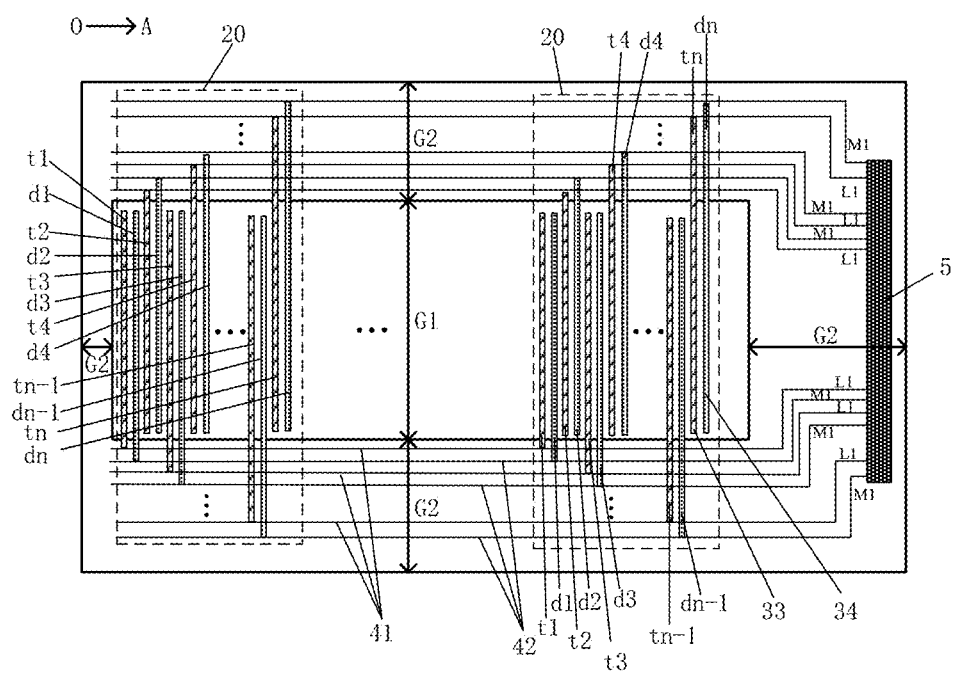
FIG. 2a and FIG. 2b are schematic structural diagrams of a grating regulating device in the related art.
Figure 2B:
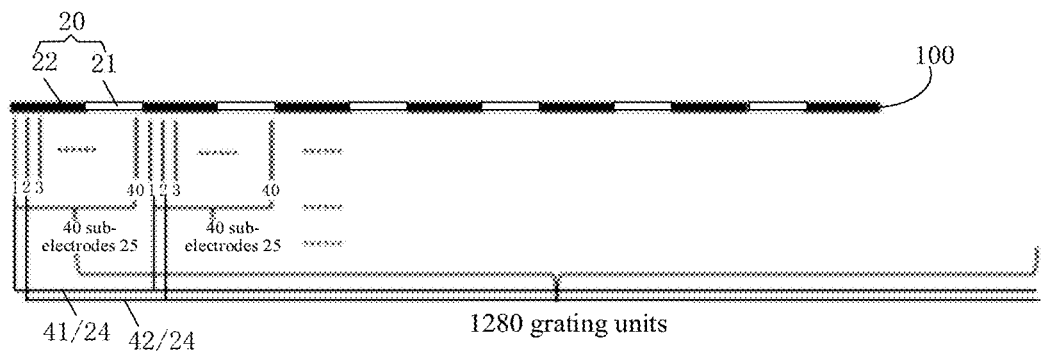

FIG. 2b shows the state of the connection between the driving lines and the sub-electrodes in one common-signal unit. In FIG. 2b, the common-signal unit 23 comprises 1280 grating units 20, and each of the grating units 20 comprises 40 sub-electrodes 25. In each of the grating units 20, the serial numbers in the first direction of the 40 sub-electrodes 25 are 1, 2, 3 . . . and 40. In the common-signal unit shown in FIG. 2b, the sub-electrodes that have the same serial number (for example, the sub-electrodes 25 whose serial number is 1 in FIG. 2b) are connected to the same driving line 24. The common-signal unit shown in FIG. 2b is connected to totally 40 driving lines 24, each of the driving lines 24 is connected to 1280 sub-electrodes 25, and the 1280 sub-electrodes 25 are located in different grating units 20.

Figure 10:
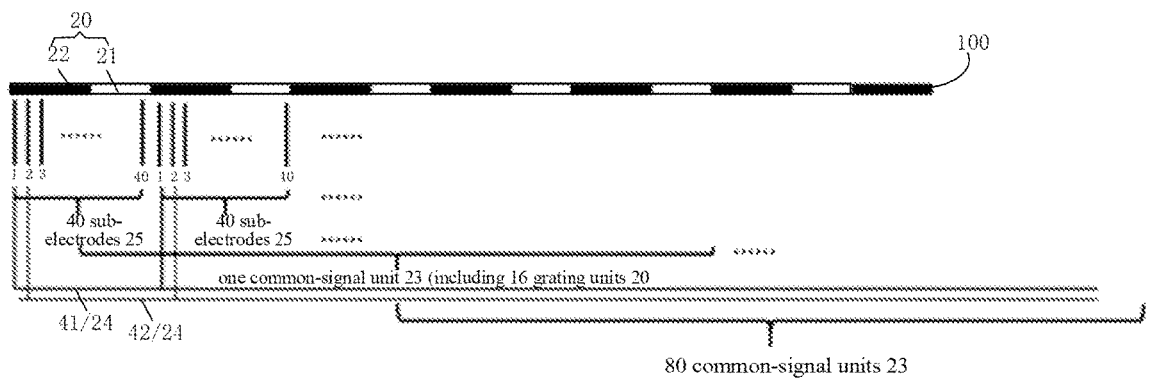
FIG. 10 is a schematic diagram of a connection structure of a grating regulating device according to an embodiment of the present disclosure.

FIG. 10 shows the state of the connection between the driving lines and the sub-electrodes in the plurality of common-signal units. As shown in FIG. 10, the grating regulating device 100 comprises 1280 grating units 20, and each of the grating units 20 comprises 40 sub-electrodes 25. 16 continuously arranged grating units 20 form one common-signal unit 23, the 1280 grating units 20 are divided into 80 common-signal units 23, and there are totally 80*16=1280 grating units 20. In each of the grating units 20, the serial numbers in the first direction of the 40 sub-electrodes 25 are 1, 2, 3 . . . and 40. In each of the common-signal units 23, the sub-electrodes 25 that have the same serial number (for example, the sub-electrodes 25 whose serial number is 1 in FIG. 10) are connected to the same driving line 24. In the grating regulating device 100 shown in FIG. 10, each of the common-signal units 23 is connected to 40 driving lines 24, it is required to provide totally 80*40=3200 driving lines 24, each of the driving lines 24 is connected to 16 sub-electrodes 25, and the 16 sub-electrodes 25 are located in different grating units 20 in the same common-signal unit 23.

In a particular implementation, one common-signal unit 23 may comprise one grating unit 20 or a plurality of grating units 20. As compared with the solution in which one common-signal unit 23 comprises merely one grating unit 20, in the solution in which the common-signal unit 23 comprises a plurality of grating units 20, one driving line 24 can simultaneously control the plurality of sub-electrodes 25 in the same common-signal unit 23, which can reduce the difficulty in the controlling, and reduce the quantity of the driving lines 24, to facilitate to save the room, and reduce the cost.

As shown in FIG. 1, the grating regulating device 100 may further comprise a second electrode layer 4. The first substrate 1 and the second substrate 2 face each other, the first electrode layer 3 is provided on the side of the first substrate 1 that is close to the second substrate 2, and the second electrode layer 4 is provided on the side of the second substrate 2 that is close to the first substrate 1; in other words, the second electrode layer 4 is located between the dielectric layer 19 and the second substrate 2.

Optionally, as shown in FIG. 1, the first electrode layer 3 comprises a first sub-electrode layer 31, a second insulating layer 35 and a second sub-electrode layer 32 that are arranged in stack, and the first sub-electrode layer 31 is located between the first insulating layer 27 and the second insulating layer 35.

As shown in FIG. 11 to FIG. 15, the plurality of sub-electrodes 25 include a plurality of first sub-electrodes 33 that are arranged in the first direction (the direction OA), and a plurality of second sub-electrodes 34 that are arranged in the first direction (the direction OA), and the orthographic projections of the first sub-electrodes 33 on the first substrate 1 and the orthographic projections of the second sub-electrodes 34 on the first substrate 1 are alternately arranged.

As shown in FIG. 1, the plurality of first sub-electrodes 33 are located at the first sub-electrode layer 31, and the first sub-electrodes 33 and the corresponding driving lines 24 are connected by first via holes H1 provided in the first insulating layer 27. The plurality of second sub-electrodes 34 are located at the second sub-electrode layer 32, and the second sub-electrodes 34 and the corresponding driving lines 24 are connected by second via holes H2 provided in the first insulating layer 27 and the second insulating layer 35. In FIG. 1, the wiring layer 26 is provided close to the first substrate 1.

As shown in FIG. 11 to FIG. 15, the plurality of driving lines 24 include first driving lines 41 connected to the first sub-electrodes 33, and second driving lines 42 connected to the second sub-electrodes 34. In a particular implementation, both of the first driving line 41 and the second driving line 42 are a driving line 24, and the first driving line 41 and the second driving line 42 may be located at the same layer (as shown in FIG. 1) or different layers.

Particularly, as shown in FIG. 1, the first sub-electrode 33 and the first driving line 41 are connected by a first via hole H1 provided in the first insulating layer 27. The second sub-electrode 34 and the second driving line 42 are connected by a second via hole H2 provided in the first insulating layer 27 and the second insulating layer 35.

Figure 3:
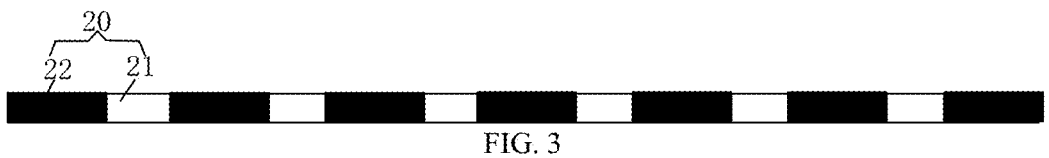
FIG. 3 is a schematic structural diagram of grating units according to an embodiment of the present disclosure.

As shown in FIG. 11 to FIG. 15, the grating regulating device 100 comprises a plurality of first driving lines 41, a plurality of second driving lines 42, and a plurality of grating units 20 arranged in the first direction (the direction OA). Each of the grating units 20 comprises a plurality of first sub-electrodes 33 and a plurality of second sub-electrodes 34. Each of the grating units 20 is configured so that, when the grating regulating device 100 is powered on, as shown in FIG. 3, the grating unit 20 can form a light transmitting unit 21 and a light shielding unit 22, and the opening position (i.e., the position of the light transmitting unit 21) and/or the aperture ratio (i.e., the ratio of the areas of the light transmitting unit 21 to the grating unit 20) of the grating unit 20 is regulatable.

When the grating regulating device 100 is powered on, the driving lines 24 can transmit a driving signal inputted by the signal inputting terminal to the sub-electrodes 25, and the sub-electrodes 25, by the effect of the driving signal, drive the corresponding positions of the dielectric layer 19 to be light-transmitting or opaque, thereby causing the grating units 20 to form the light transmitting units 21 and the light shielding units 22.

As shown in FIG. 11 to FIG. 15, that the plurality of sub-electrodes 25 located in the same grating unit 20 are connected to different driving lines 24 particular refers to that the plurality of first sub-electrodes 33 located in the same grating unit 20 are connected to different first driving lines 41, and the plurality of second sub-electrodes 34 located in the same grating unit 20 are connected to different second driving lines 42.

In the same grating unit 20, the first sub-electrodes 33 are controlled by different first driving lines 41, and the second sub-electrodes 34 are controlled by different second driving lines 42. Accordingly, the voltages of each of the first sub-electrodes 33 and each of the second sub-electrodes 34 in the same grating unit 20 can be controlled more precisely and accurately, and accordingly the sizes and the positions of the light shielding units and light transmitting units of the grating unit 20 can be adjusted more accurately, thereby alleviating the problem of interference caused by viewpoint movement.

In the first electrode layer 3, the first sub-electrode layer 31 may be, as shown in FIG. 1, provided on the side of the second sub-electrode layer 32 that is close to the first substrate 1, or the first sub-electrode layer 31 may be provided on the side of the second sub-electrode layer 32 that is away from the first substrate 1, which is not limited herein.

It should be noted that the first sub-electrode layer 31 and the second sub-electrode layer 32 may also be arranged in the same film layer, and the plurality of sub-electrodes 25 arranged in the same layer are separated from each other, to prevent short circuiting.

As shown in FIG. 1, the dielectric layer 19 is provided between the first electrode layer 3 and the second electrode layer 4, and may comprise a material whose transmittance can be changed by the effect of the electric field formed by the first electrode layer 3 and the second electrode layer 4, for example, liquid-crystal molecules. Further, the liquid crystal may be the TN (Twisted Nematic) type liquid crystal and so on, which is not limited in the present disclosure.

As shown in FIG. 1, the second electrode layer 4 may comprise third sub-electrodes 25 provided at the whole face. When electrified, the first sub-electrodes 33 and the second sub-electrodes 34 individually form an electric field with the third sub-electrodes 25, to change the state of torsion of the liquid-crystal molecules located between the first electrode layer 3 and the second electrode layer 4, and accordingly change the light-emission amount after the light rays pass through the grating regulating device 100, thereby forming light transmitting units and light shielding units.

The width of the first sub-electrodes 33 in the first direction (the direction OA) and the width of the second sub-electrodes 34 in the first direction (the direction OA) are not limited, and may be selected particularly according to factors such as the size of the display panel 200.

Figure 4:
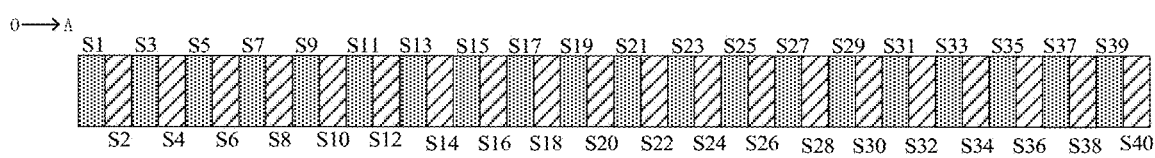
FIG. 4 and FIG. 5 are schematic structural diagrams of two first sub-electrodes and second sub-electrodes according to an embodiment of the present disclosure.
Figure 5:
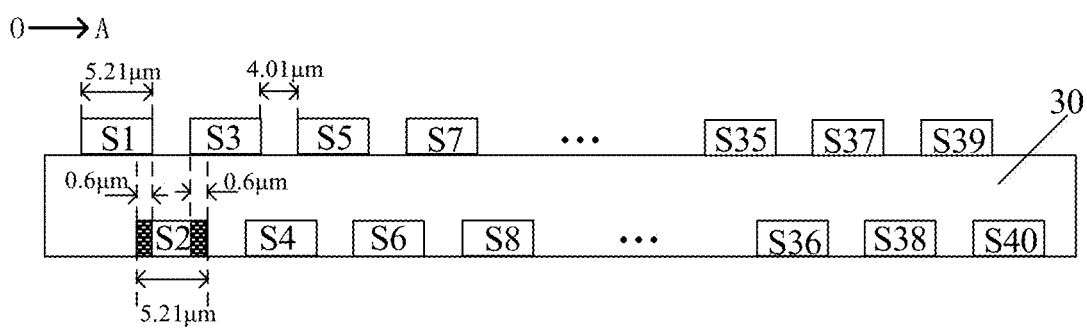

As an example, the grating regulating device 100 is applied in a 10.95-inch 3D displaying device. The grating unit 20 may, as shown in FIG. 4, comprise 20 first sub-electrodes 33 (marked as S2, S4, S6 . . . and S40) and 20 second sub-electrodes 34 (marked as S1, S3, S5 . . . and S39). As shown in FIG. 5, the width in the first direction (the direction OA) of the first sub-electrode 33 and the second sub-electrode 34 may be 5.2 µm, the spacing in the first direction (the direction OA) between the neighboring first sub-electrodes 33 may be 4.0 µm, and the width in the first direction (the direction OA) of the part of the boundary on the two sides of the first sub-electrode 33 that overlaps with the second sub-electrode 34 in the direction perpendicular to the first substrate 1 is 0.6 µm.

It should be noted that, in the practical fabricating process, because of the process errors, the dimensions such as the widths and the spacing in the first direction (the direction OA) of the first sub-electrode 33 and the second sub-electrode 34 might have deviations, and the dimensions are not particularly limited in the present disclosure.

The orthographic projections of the first sub-electrodes 33 on the first substrate 1 and the orthographic projections of the second sub-electrodes 34 on the first substrate 1 are alternately arranged, and the orthographic projections of the first sub-electrodes 33 on the first substrate 1 and the orthographic projections of the second sub-electrodes 34 on the first substrate 1 may partially overlap, or not overlap, which is not limited herein. As restrained by the relevant process, the boundaries of the first sub-electrodes 33 and the boundaries of the second sub-electrodes 34 partially overlap in the direction perpendicular to the first substrate 1, and accordingly the orthographic projections of the first sub-electrodes 33 on the first substrate 1 and the orthographic projections of the second sub-electrodes 34 on the first substrate 1 partially overlap.

Taking the case as an example for the description in which the first sub-electrode layer 31 is, as shown in FIG. 1, provided on the side of the second sub-electrode layer 32 that is close to the first substrate 1, the parts of the first sub-electrodes 33 that overlap with the second sub-electrodes 34 in the direction perpendicular to the first substrate 1 (for example, the black-marked parts of the first sub-electrode 33 marked as S2 in FIG. 5) are silent electrodes, are shielded by the second sub-electrode 34s, and have no action on the liquid crystal. The parts of the first sub-electrodes 33 that do not overlap with the second sub-electrodes 34 in the direction perpendicular to the first substrate 1 are active electrodes, and can control the liquid crystal to rotate. The second sub-electrodes 34 are closer to the liquid-crystal layer than the first sub-electrodes 33, and are not influenced by the first sub-electrodes 33. Therefore, all of the second sub-electrodes 34 are active electrodes, and can control the liquid crystal to rotate.

Certainly, if the first sub-electrode layer 31 is provided on the side of the second sub-electrode layer 32 that is away from the first substrate 1, the first sub-electrodes 33 are closer to the liquid-crystal layer than the second sub-electrodes 34, and all of the first sub-electrodes 33 are active electrodes, and can control the liquid crystal to rotate. The parts of the second sub-electrodes 34 that overlap with the first sub-electrodes 33 in the direction perpendicular to the first substrate 1 are silent electrodes, are shielded by the first sub-electrodes 33, and have no action on the liquid crystal. The parts of the second sub-electrodes 34 that do not overlap with the first sub-electrodes 33 in the direction perpendicular to the first substrate 1 are active electrodes, and can control the liquid crystal to rotate.

The shapes of the first sub-electrodes 33 and the second sub-electrodes 34 are not limited. As an example, the shapes of the first sub-electrodes 33 and the second sub-electrodes 34 may comprise the strip shape shown in FIG. 11 to FIG. 15, and the shapes of their cross-sections may comprise a rectangle, a square, a regular trapezoid, an inversed trapezoid and so on. FIG. 1 and FIG. 5 illustrate by taking the case as an example in which the cross-sections of the first sub-electrodes 33 and the second sub-electrodes 34 are a rectangle.

When the grating regulating device 100 is powered on, as shown in FIG. 3, the grating units 20 can form light transmitting units 21 and light shielding units 22. The light transmitting units can transmit light rays (which are equivalent to the openings of the grating units 20), and the light shielding units cannot transmit light. The plurality of grating units 20 cooperate to finally form a grating having a plurality of openings. The aperture ratio of the grating units 20 is the area of the light transmitting units/(the area of the light transmitting units+the area of the light shielding units).

The grating regulating device 100 is applied in a 3D displaying device. As shown in FIG. 1, the 3D displaying device comprises a display panel 200 and the grating regulating device 100, the grating regulating device 100 and the display panel 200 face each other. The grating regulating device 100 may be provided on the light exiting side of the display panel 200, in which case the grating regulating device 100 may be referred to as a front-placed grating. Alternatively, as shown in FIG. 1, the grating regulating device 100 may be provided on the shadow side of the display panel 200, in which case the grating regulating device 100 may be referred to as a rear-placed grating, which is not limited herein.

Figure 6:
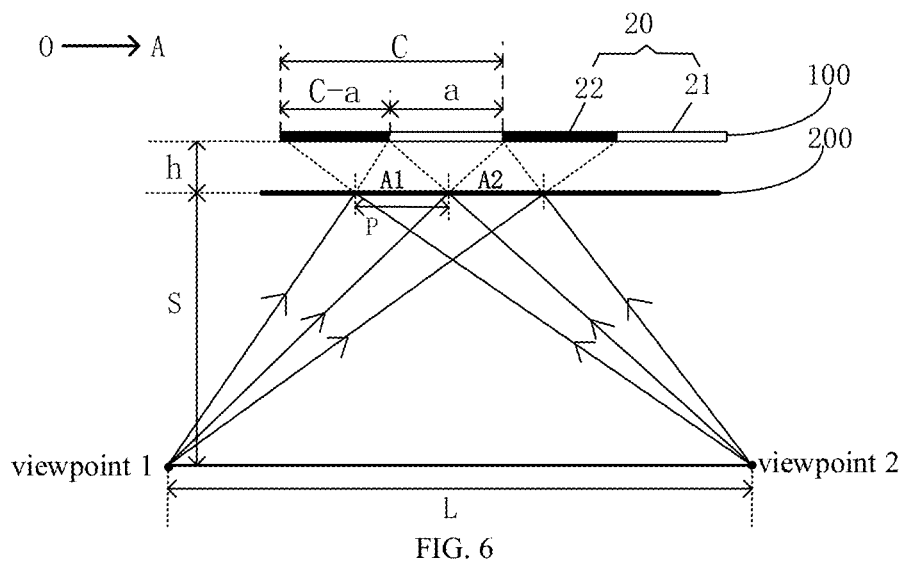
FIG. 6 is a principal diagram of realizing 3D displaying according to an embodiment of the present disclosure.

The principle of realizing the 3D displaying will be described below by taking the case as an example in which the grating regulating device 100 is provided on the shadow side of the display panel 200. As shown in FIG. 6, the positions of the left eye and the right eye of the user are marked as the viewpoint 1 and the viewpoint 2 respectively (in other words, the viewpoint quantity n is 2), the distance between the two eyes is the interpupillary distance L, the watching distance (i.e., the distance between the eyes and the display panel 200) is marked as S, the distance between the display panel 200 and the grating regulating device 100 is the placement height h, the width in the first direction (the direction OA) of a single pixel unit in the display panel 200 is P, and the width in the first direction (the direction OA) of one grating unit 20 in the grating regulating device 100 is C (which is also referred to as Pitch C), wherein the width in the first direction (the direction OA) of the light transmitting unit 21 is a, and the width in the first direction (the direction OA) of the light shielding unit 22 is C-a. It should be noted that the display panel 200 comprises a plurality of pixel units arranged in an array, and each of the pixel units may comprise a plurality of sub-pixels, for example, a red-color (R) sub-pixel, a green-color (G) sub-pixel or a blue-color (B) sub-pixel.

In FIG. 6, by controlling the opening size and the opening position of the grating units 20, as a result, the viewpoint 1, when watching a first displaying region A1 of the display panel 200, corresponds to the light transmitting unit 21, while the viewpoint 2, when watching the first displaying region A1 of the display panel 200, corresponds to the light shielding unit 22. In other words, at the same observation moment, the viewpoint 1 can see the first displaying region A1, but the viewpoint 2 cannot see the first displaying region A1. Likewise, it may also be optional that, by controlling the opening size and the opening position of the grating units 20, at the same observation moment, the viewpoint 2 can see a second displaying region A2, but the viewpoint 1 cannot see the second displaying region A2. Accordingly, the image of the first displaying region A1 seen by the viewpoint 1 and the image of the second displaying region A2 seen by the viewpoint 2 can have a parallax, thereby forming stereoscopic vision, to realize the 3D displaying.

As shown in FIG. 6, according to the geometrical relation of a triangle, it can be obtained that:

$$h/(h+S) = P/L \quad (1)$$
$$C/nP = (S+h)/S \quad (2)$$
$$a/P = (S+h)/S \quad (3)$$

By using the formulas (1), (2) and (3), it can be obtained that $c=nPL/(L-P)$ (4), $h=SP/(L-P)$ (5) and $a/C=1/n$ (6), wherein the viewpoint quantity n may be 2. The width C in the first direction (the direction OA) and the placement height h of the grating unit 20 in the grating regulating device 100 may be determined with reference to the formulas (4) and (5) respectively. In the formula (6), when the viewpoint quantity n is 2, in the grating unit 20, the width in the first direction (the direction OA) of the light transmitting unit and the width in the first direction (the direction OA) of the light shielding unit are equal.

In the practical usage of 3D displaying devices, there are various cases that cause interference.

Figure 7:
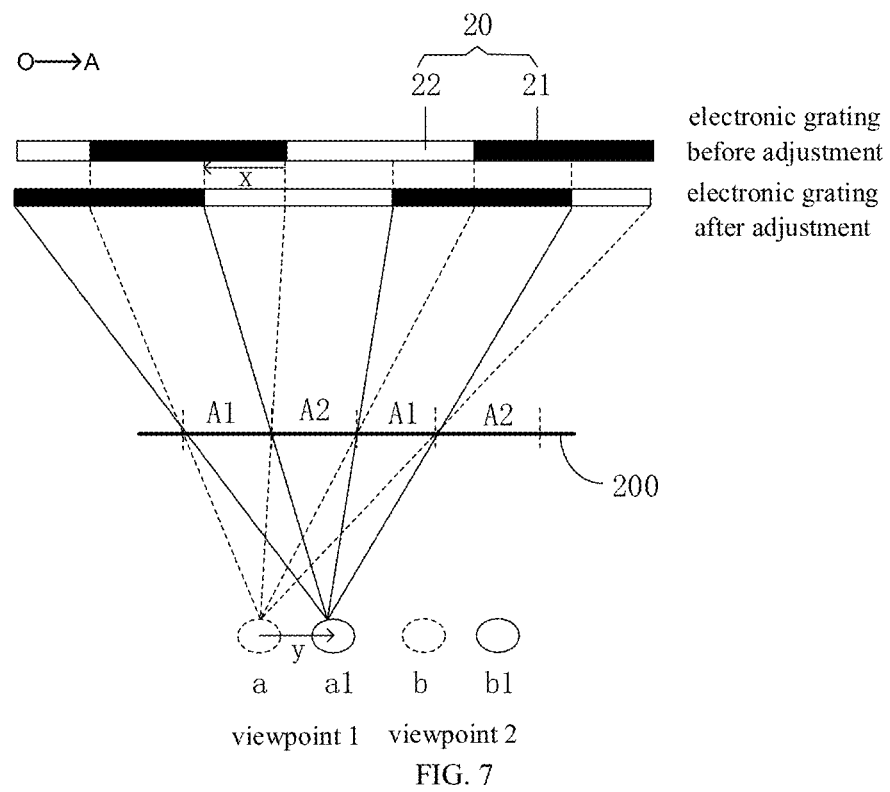
FIG. 7 is a principal diagram of the preventing of interference after horizontal rightward movement of the viewpoints according to an embodiment of the present disclosure.

The first case is the interference caused by left-right movement in the horizontal direction of the user when the watching distance is constant. As shown in FIG. 7, taking the case as an example for the description in which the viewpoints move rightward in the first direction (the direction OA), the viewpoint 1 moves from the position a to the position a1, and the viewpoint 2 moves from the position b to the position b1. If the widths in the first direction (the direction OA) of the light shielding unit and the light transmitting unit of the grating unit 20 are not changed, or, in other words, the structure of the grating regulating device 100 is still the structure before the adjustment, taking the case as an example for the description in which the viewpoint 1 is at the position a and the position a1 individually, when the viewpoint 1 is at the position a, when it is watching the first displaying region A1 of the display panel 200, it corresponds to the light shielding unit, and accordingly the viewpoint 1 cannot see the first displaying region at the position a. However, when the viewpoint 1 is at the position a1, when it is watching the first displaying region A1 of the display panel 200, it corresponds to part of the light shielding unit and part of the light transmitting unit, and accordingly the viewpoint 1 can see the first displaying region at the position a1. In other words, when the viewpoint 1 moves from the position a to the position a1, the displaying region that it can watch changes, whereby interference happens, which results in bad experience of the user such as nausea and dizziness. In FIG. 7, in order to compare the structures of the grating regulating device 100 before and after the adjustment better, they are illustrated separately.

In order to solve the problem of interference caused by the left-right movement in the horizontal direction, the opening positions of the grating units 20 in the grating regulating device 100 may be controlled, thereby matching the viewpoints after the movement. Because, in the same grating unit 20, different first sub-electrodes 33 are connected to different first driving lines 41, and different second sub-electrodes 34 are connected to different second driving lines 42, by using a plurality of first driving lines 41 and a plurality of second driving lines 42 to control the voltages of the corresponding first sub-electrodes 33 and second sub-electrodes 34, part or the whole of the light transmitting unit is converted into a light shielding unit, and part or the whole of the light shielding unit is converted into a light transmitting unit, to realize the changing of the opening position of the grating unit 20.

As shown in FIG. 7, taking the viewpoint 1 as an example for the description, when the viewpoint 1 moves from the position a to the position a1 (moving rightward in the first direction (the direction OA)), by controlling the first driving lines 41 and the second driving lines 42, the positions of the light shielding unit and light transmitting unit of the grating unit 20 can be changed (the grating regulating device 100 is moved leftward overall), and the grating unit 20 after the adjustment is shown in FIG. 7. After the adjustment, the viewpoint 1 cannot see the first displaying region at the position a1, which ensures to the largest extent that the watch effect is consistent after the viewpoint movement, thereby alleviating the interference.

As shown in FIG. 7, according to the geometrical relation of a triangle, if the movement distance of the viewpoint 1 is y, and the distance of the leftward movement of the grating regulating device 100 is x, then x/y=h/S, wherein h is the placement height, and S is the watching distance. Taking a 10.95-inch 3D displaying device as an example, the situation of the distribution of the first sub-electrodes 33 and the second sub-electrodes 34 is shown in FIG. 4. The average widths in the first direction (the direction OA) of the first sub-electrodes 33 and the second sub-electrodes 34 individually may be 4.6 μm, each of the grating units 20 comprises 20 first sub-electrodes 33 and 20 second sub-electrodes 34, the pixel width P=92.13 μm, the interpupillary distance L=65 mm, and the viewing distance 5=450 mm. Accordingly, the Pitch C of the grating regulating device 100=184.52 μm, and, in left-right horizontal movement, the theoretical maximum interference is approximately 5%, which meets the expected value.

As shown in FIG. 5, because the width in the first direction of each of the first sub-electrodes 33 and each of the second sub-electrodes 34 is 5.21p m, and the spacing in the first direction between the neighboring first sub-electrodes 33 is 4.01 μm, the total width of two neighboring sub-electrodes 25 is 9.22 μm, and the average width in the first direction of the sub-electrodes 25 may be approximately 4.6 μm; in other words, 9.22 μm/2≈4.6 μm.

Because the average width of the sub-electrodes 25 is 4.6 μm, the theoretical maximum deviation value caused by horizontal movement is 4.6 μm, and the theoretical maximum interference=the theoretical maximum deviation value caused by horizontal movement/the pixel width=4.6 μm/92.13 μm=5%.

In the present disclosure, in the same grating unit 20, different first sub-electrodes 33 are connected to different first driving lines 41, and different second sub-electrodes 34 are connected to different second driving lines 42. Accordingly, by using a plurality of first driving lines 41 and a plurality of second driving lines 42 to control the voltages of the corresponding first sub-electrodes 33 and second sub-electrodes 34, part or the whole of the light transmitting unit is converted into a light shielding unit, and part or the whole of the light shielding unit is converted into a light transmitting unit, to realize the changing of the opening position of the grating unit 20, thereby alleviating the interference caused by horizontal left-right movement of the user when the watching distance is constant.

Figure 8A:
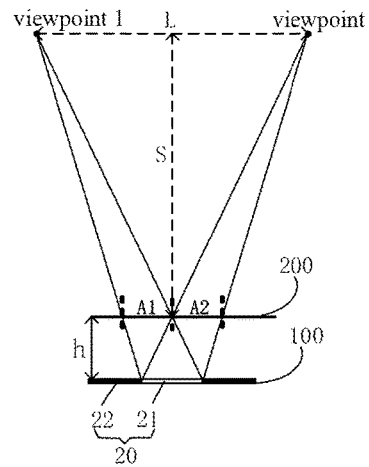
FIG. 8a is a principal diagram when no interference happens.
Figure 8B:
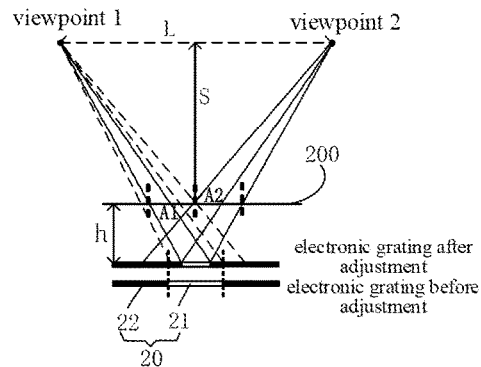
FIG. 8b is a principal diagram when the watching distance is reduced.
Figure 8C:
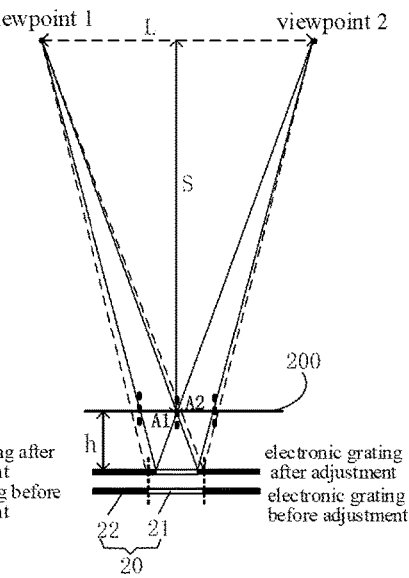
FIG. 8c is a principal diagram when the watching distance is increased.

The second case is the interference caused by the changing of the watching distance. As shown in FIG. 8a to FIG. 8c, FIG. 8a is a diagram of the sight lines at the optimum watching distance, in which case no interference happens, wherein the viewpoint 1 (the left eye) can see the first displaying region A1, and the right eye can see the second displaying region A2. FIG. 8b is a diagram of the sight lines when the watching distance is reduced. After the watching distance is reduced, if the structure of the grating regulating device 100 maintains unchanged, the viewpoint 1 (the left eye) can see the first displaying region A1 and part of another displaying region on the left side of the first displaying region A1, and the viewpoint 2 (the right eye) can see the second displaying region A2 and part of another displaying region on the right side of the second displaying region A2, thereby resulting in interference. FIG. 8c is a diagram of the sight lines when the watching distance is increased. After the watching distance is increased, if the structure of the grating regulating device 100 maintains unchanged, the viewpoint 1 (the left eye) can see the whole of the first displaying region A1, part of another displaying region on the left side of the first displaying region A1, and part of the second displaying region A2, and the viewpoint 2 (the right eye) can see the whole of the second displaying region A2, part of another displaying region on the right side of the second displaying region A2, and part of the first displaying region A1, thereby resulting in interference. In other words, when the watching distance changes (including getting farther or getting closer), the displaying region that it can watch changes, whereby interference happens, which results in bad experience of the user such as nausea and dizziness.

In order to solve the problem of interference caused by the changing of the watching distance, the aperture ratio of the grating units 20 in the grating regulating device 100 may be controlled, so that the aperture ratio of the grating units 20 after the adjustment is =0.5*(1−h*(L−P)*|1/S−1/S'|/P), wherein S is the optimum watching distance before the far-near movement, and S' is the watching distance after the far-near movement. Furthermore, from the formula of the aperture ratio, it can be inversely deduced that the watching distance corresponding to the maximum aperture ratio is the corresponding optimum watching distance after the aperture ratio changes. Furthermore, according to the geometrical relation of a triangle, it can be deduced that, in the far-near movement, the theoretical width in the first direction (the direction OA) of the grating unit 20 in the grating regulating device 100 is =2P(1+h/S).

FIG. 2b illustrates by taking the case as an example in which the grating regulating device 100 is applied in a 10.95-inch 3D displaying device. The grating regulating device 100 may comprise 1280 grating units 20, and all of the 1280 grating units 20 are located in the same common-signal unit 23. Each of the grating units 20 comprises 20 first sub-electrodes 33 and 20 second sub-electrodes 34, and the serial numbers of the alternately arranged first sub-electrodes 33 and second sub-electrodes 34 are 1, 2, 3 . . . and 40. In the common-signal unit 23, the first sub-electrodes 33 that have the same serial number (for example, the first sub-electrodes 33 whose serial number is 1 in FIG. 2b) are connected to the same first driving line 41, and the second sub-electrodes 34 that have the same serial number (for example, the first sub-electrodes 33 whose serial number is 2 in FIG. 2b) are connected to the same second driving line 42.

FIG. 2a shows a schematic planar structural diagram of the grating regulating device shown in FIG. 2b. As shown in FIG. 2a, in each of the grating units 20, a plurality of first sub-electrodes 33 are ordered in the first direction (the direction OA) (the first sub-electrodes 33 whose serial numbers are 1, 2, 3 . . . and n are marked as t1, t2, t3 . . . and tn respectively), and a plurality of second sub-electrodes 34 are ordered in the first direction (the direction OA) (the second sub-electrodes 34 whose serial numbers are 1, 2, 3 . . . and n are marked as d1, d2, d3 . . . and dn). The first sub-electrodes 33 whose serial number is t1 in the first grating unit 20 on the left and the first grating unit 20 on the right are connected to the same first driving line 41 marked as L1, and the second sub-electrodes 34 whose serial number is d1 in the first grating unit 20 on the left and the first grating unit 20 on the right are connected to the same second driving line 42 marked as M1. The first sub-electrodes 33 and the second sub-electrodes 34 of the other serial numbers may refer to the above, and are not listed one by one herein.

As shown in FIG. 2a and FIG. 2b, if all of the grating units 20 in the grating regulating device 100 are located in the same common-signal unit 23, in the far-near regulation, by referring to the above description, when the placement height h of the grating regulating device 100 and the pixel width P of the display panel 200 are determined, the parameters such as the aperture ratio of the grating unit 20, the theoretical width of the grating unit 20, the design width deviation and the proportion of the area where the interference is ≤10%, at different watching distances, can be obtained, the particular situation of which may refer to Table 1.

sub-electrodes 25 located in the same grating unit 20 are ordered in the first direction (the direction OA), and, among the plurality of sub-electrodes 25 located in the same common-signal unit 23, the sub-electrodes 25 that have the same serial number are connected to the same driving line 24.

As shown in FIG. 10, FIG. 10 illustrates by taking the case as an example in which the grating regulating device 100 is applied in a 10.95-inch 3D displaying device. Each of the grating units 20 comprises 20 first sub-electrodes 33 and 20 second sub-electrodes 34. In each of the grating units 20, the serial numbers of the 20 first sub-electrodes 33 and the 20 second sub-electrodes 34 are 1, 2, 3 . . . and 40. In the same common-signal unit 23, the first sub-electrodes 33 that have the same serial number are connected to the same first driving line 41, and the second sub-electrodes 34 that have the same serial number are connected to the same second driving line 42.

Particularly, as shown in FIG. 11 to FIG. 15, in each of the grating units 20, a plurality of first sub-electrodes 33 are ordered in the first direction (the direction OA) (the first sub-electrodes 33 whose serial numbers are 1, 2, 3 . . . and n are marked as t1, t2, t3 . . . and tn respectively), and a plurality of second sub-electrodes 34 are ordered in the first direction (the direction OA) (the second sub-electrodes 34 whose serial numbers are 1, 2, 3 . . . and n are marked as d1,

TABLE 1

| | watching distance/mm | | | | | | | | |
|---|---|---|---|---|---|---|---|---|---|
| | 300 | 350 | 400 | 450 | 500 | 550 | 600 | 650 | 700 |
| aperture ratio of grating unit 20 | 0.25 | 0.36 | 0.44 | 0.50 | 0.45 | 0.41 | 0.38 | 0.35 | 0.32 |
| theoretical width of grating unit 20 Pitch/μm | 184.65 | 184.60 | 184.55 | 184.52 | 184.50 | 184.47 | 184.46 | 184.44 | 184.43 |
| design width deviation | 0.13 | 0.08 | 0.03 | 0.00 | −0.02 | −0.05 | −0.06 | −0.08 | −0.09 |
| maximum deviation amount | 169.35 | 97.62 | 43.81 | 0.00 | −31.51 | −58.90 | −81.72 | −101.04 | −117.59 |
| area where interference is ≤10% when leftmost side of screen is used as direct middle | 5.44% | 9.44% | 21.03% | 100.00% | 29.24% | 15.64% | 11.27% | 9.12% | 7.83% |

In Table 1, when the watching distance is 450 mm, the corresponding structure has no interference. It can be seen from Table 1 that, when the watching distance is 450 mm and the far-near deviation is 50 mm, merely approximately 20% of the area where the interference is ≤10% is left.

Figure 9:
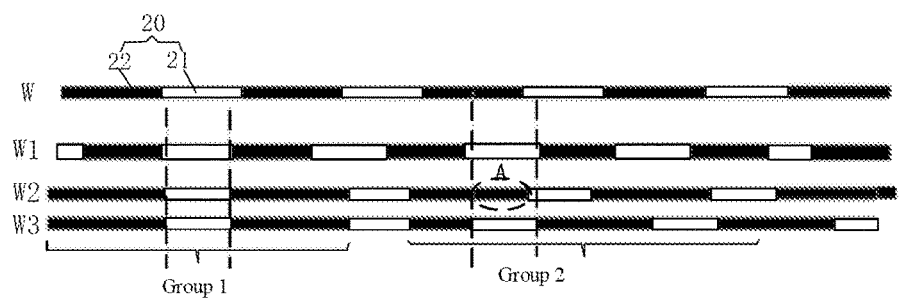
FIG. 9 is a principal diagram of the adjustment of the aperture ratios of some types of grating units according to an embodiment of the present disclosure.

The initial structure of the plurality of grating units 20 is shown by W in FIG. 9. After the adjustment of the watching distance (i.e., after the far-near movement), the required structure of the grating units 20 is shown by W1 in FIG. 9, wherein the aperture ratio of the grating units 20 is reduced. If the solution in which all the grating units 20 are located in the same common-signal unit 23 is employed, or, in other words, all of the grating units 20 are regulated overall, the structure of the grating units 20 after the adjustment on the aperture ratio is shown by W2 in FIG. 9. Because they are regulated overall, the positions of the light-transmitting regions have an accumulative deviation, as shown by the region A in FIG. 9, and therefore the interference cannot be thoroughly eliminated.

In order to solve the above problem, in the present disclosure, as shown in FIG. 10, the plurality of grating units 20 in the grating regulating device 100 are divided into a plurality of groups, and the grating units 20 located in the same group form one common-signal unit 23. In other words, the grating region G1 comprises a plurality of common-signal units 23, each of the common-signal units 23 comprises at least one grating unit 20, the plurality of d2, d3 . . . and dn). In the same common-signal unit 23, as shown in FIGS. 11 to 15, the first sub-electrodes 33 that have the same serial number (for example, the first sub-electrodes 33 marked as t1) are connected to the same first driving line 41, and the second sub-electrodes 34 that have the same serial number (for example, the second sub-electrodes 34 marked as d1) are connected to the same second driving line 42.

As shown in FIG. 9, by dividing the plurality of grating units 20 into the plurality of common-signal units 23, the plurality of common-signal units 23 can be adjusted separately, and the adjustments of the different common-signal units 23 do not influence each other. The structure after the regulation on the aperture ratios of grating units 20 by using that solution is shown by W3 in FIG. 9. Because the different common-signal units 23 can be adjusted separately, and the adjustments on the aperture ratios of the grating units 20 in the different common-signal units 23 are independent of each other, the aperture ratio of the grating units 20 in the common-signal unit marked as the group 1 and the aperture ratio of the grating units 20 in the common-signal unit marked as the group 2 in FIG. 9 can be reduced separately, which can prevent accumulative deviation, thereby reducing the problem of interference caused by the far-near movement. Furthermore, the adjustment on the aperture ratio does not result in the problem of a sharply decreasing brightness.

The same design parameters as those of Table 1 are used, and the difference is that the 1280 grating units 20 are divided into 80 common-signal units 23 to be separately controlled. When the width of each of the first sub-electrodes 33 and each of the second sub-electrodes 34 is 5.21 μm, and the spacing between the neighboring first sub-electrodes 33 is 4.01 μm, by referring to the above description, table 2 can be obtained by calculation.

As shown in FIG. 1 and FIG. 11 to FIG. 15, the grating regulating device 100 further comprises a non-grating region G2 located on at least one side of the grating region G1.

In a particular implementation, the configuration of the plurality of driving lines 24 in the grating regulating device

TABLE 2

|  | watching distance/mm | | | | | | | | |
| --- | --- | --- | --- | --- | --- | --- | --- | --- | --- |
|  | 300 | 350 | 400 | 450 | 500 | 550 | 600 | 650 | 700 |
| aperture ratio of grating unit 20 | 0.25 | 0.36 | 0.44 | 0.50 | 0.45 | 0.41 | 0.38 | 0.35 | 0.32 |
| theoretical width of grating unit 20 Pitch/μm | 184.65 | 184.60 | 184.55 | 184.52 | 184.50 | 184.47 | 184.46 | 184.44 | 184.43 |
| design width deviation | 0.13 | 0.08 | 0.03 | 0.00 | −0.02 | −0.05 | −0.06 | −0.08 | −0.09 |
| minimum period corresponding width of grating units 20 | 70 | 121 | 269 | — | 375 | 200 | 144 | 117 | 100 |
| maximum interference | 0-5.2% | 0-3.6% | 0-2.9% | — | 0-2.9% | 0-3.1% | 0-3.4% | 0-3.7% | 0-4.0% |

In Table 2, when the watching distance is 450 mm, the corresponding structure has no interference. It can be seen from Table 2 that, when the watching distance is 400 mm-600 mm, all of the maximum interferences are less than 5%, and the interference is greatly reduced, and is far less than the design requirement. It should be noted that the quantity of the common-signal units 23 is N, the maximum deviation amount corresponding to the common-signal units 23 is N1, the width of the grating units 20 is C, and taking the case as an example in which the designed interference value ≤5%, the numerical value of N may be determined according to N1/N≤5%*C, wherein the maximum deviation amount N1 is the average width in the first direction of the sub-electrodes 25 in the grating units 20.

As shown in FIG. 10 to FIG. 15, two sub-electrodes 25 located in different common-signal units 23 are connected to different driving lines 24.

When the plurality of grating units 20 in the grating regulating device 100 are divided into the plurality of common-signal units 23, optionally, the plurality of driving lines 24 may be divided into a plurality of wiring units, the quantity of the wiring units is equal to the quantity of the common-signal units 23, the plurality of wiring units are connected to different common-signal units 23, and the quantity of the driving lines 24 in each of the wiring units is equal to the quantity of the sub-electrodes 25 in each of the grating units 20.

Figure 12:
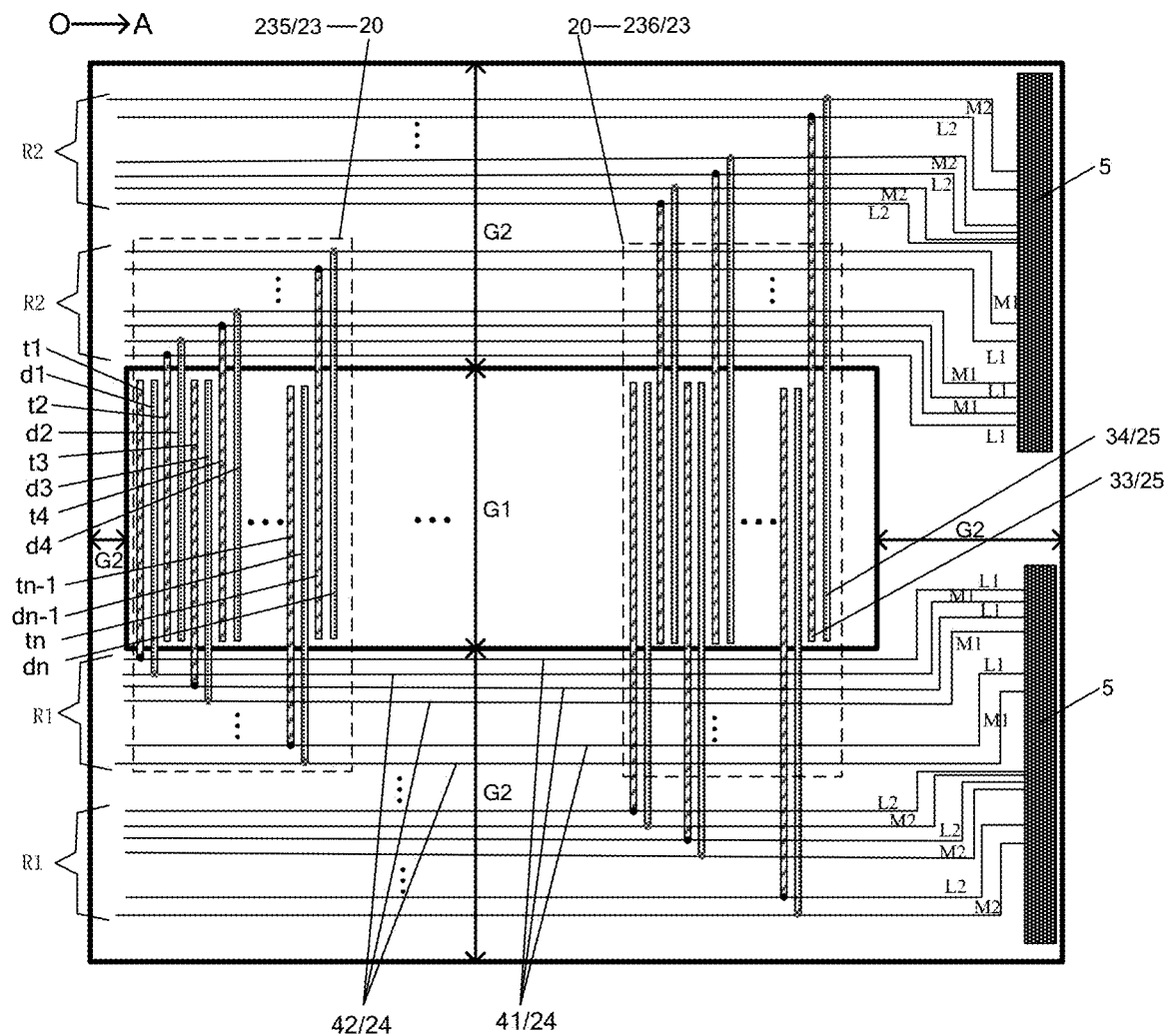

As shown in FIG. 12, in the first common-signal unit 23 on the left, a plurality of first sub-electrodes 33 are connected to the first driving lines 41 marked as L1, a plurality of second sub-electrodes 34 are connected to the second driving lines 42 marked as M1, and those first driving lines 41 marked as L1 and second driving lines 42 marked as M1 form one wiring unit.

In the first common-signal unit 23 on the right, a plurality of first sub-electrodes 33 are connected to the first driving lines 41 marked as L2, a plurality of second sub-electrodes 34 are connected to the second driving lines 42 marked as M2, and those first driving lines 41 marked as L2 and second driving lines 42 marked as M2 form another wiring unit.

Accordingly, different common-signal units 23 are connected to different wiring units, and the different common-signal units 23 are separately controlled by using the plurality of wiring units, thereby realizing precisely regulating the opening positions and the aperture ratios of the grating units 20, to further alleviate the problem of interference.

100 may have various embodiments. Some of the embodiments will be illustratively described below.

Figure 11:
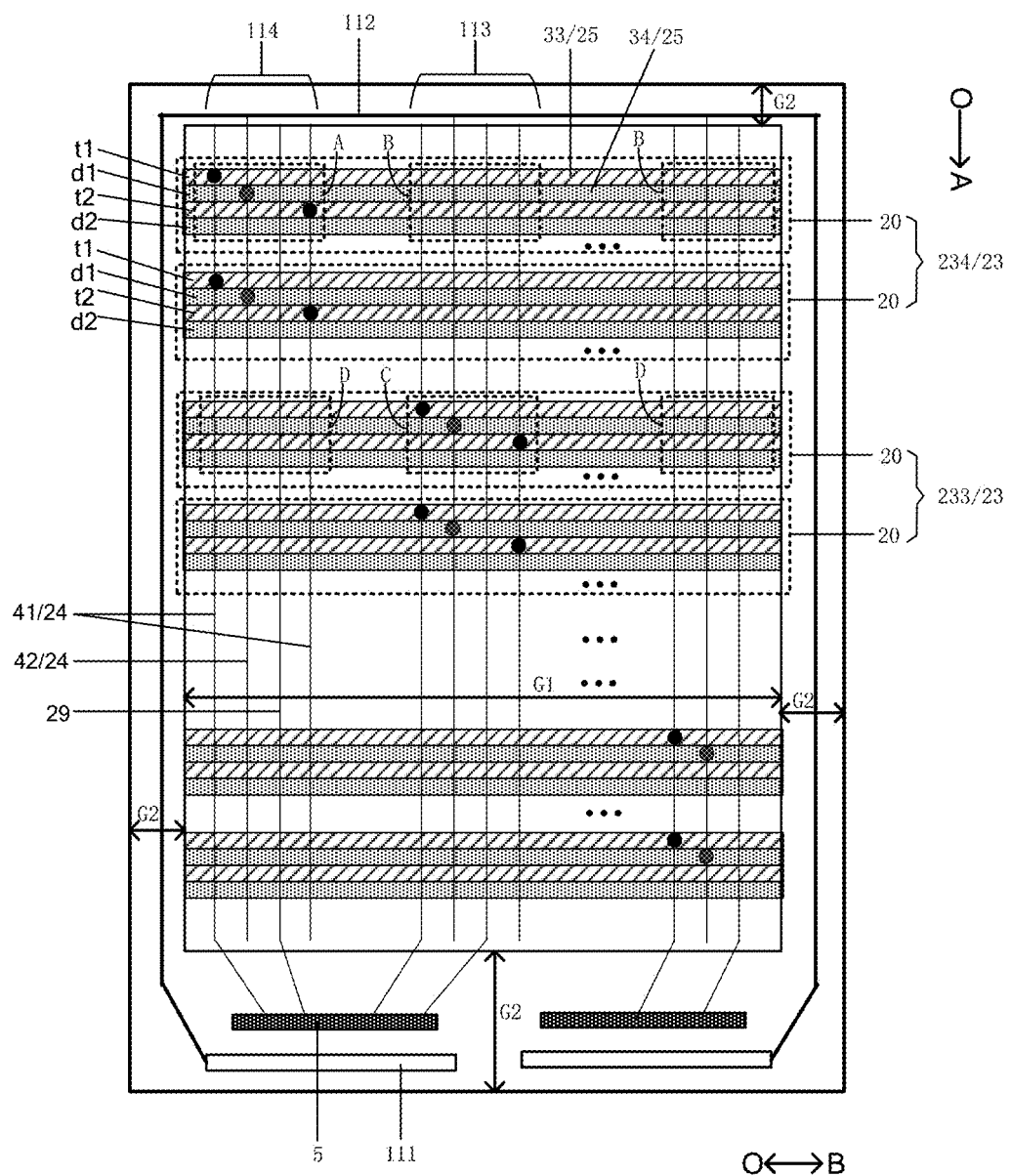
FIG. 11 to FIG. 15 are schematic planar structural diagrams of some types of grating regulating devices according to an embodiment of the present disclosure.

In a first embodiment, as shown in FIG. 11, in the grating region G1, a plurality of driving lines 24 are arranged in a second direction (the direction OB in FIG. 11), and the orthographic projections of the driving lines 24 on the first substrate 1 and the orthographic projections of the plurality of sub-electrodes 25 on the first substrate 1 intersect with each other.

The interconnected driving lines 24 and sub-electrodes 25 are connected by via holes at the positions where they intersect.

The second direction may be perpendicular to the first direction.

In the present embodiment, the signal inputting terminal may be located on any one side of the grating region G1. In order to reduce the length of the driving lines 24, and reduce the transmission resistance, optionally, as shown in FIG. 11, the signal inputting terminal may be located on any one side of the grating region G1 in the first direction (the direction OA in the figure).

In FIG. 11, the first direction is the vertical direction, and therefore the signal inputting terminal may be located on the upper side or the lower side of the grating region G1 (as shown in FIG. 11). In FIG. 11, a plurality of signal inputting terminals are provided in the region covered by the driving chips 5. The signal inputting terminals are used to bond the driving chips 5, and the signal inputting terminals and the channels of the driving chips 5 may correspond one to one.

In the present embodiment, the plurality of driving lines 24 and the plurality of signal inputting terminals may be arranged in the same layer or arranged in different layers, which is not limited in the present disclosure.

In the present embodiment, because the driving lines are provided in the grating region G1, the signal inputting terminals are merely required to be provided on one side of the grating region G1 (for example, the lower side shown in FIG. 11), and the left side, the right side and the upper side of the grating region G1 do not require wiring, whereby narrow border frames on the three sides can be realized.

Figure 16:
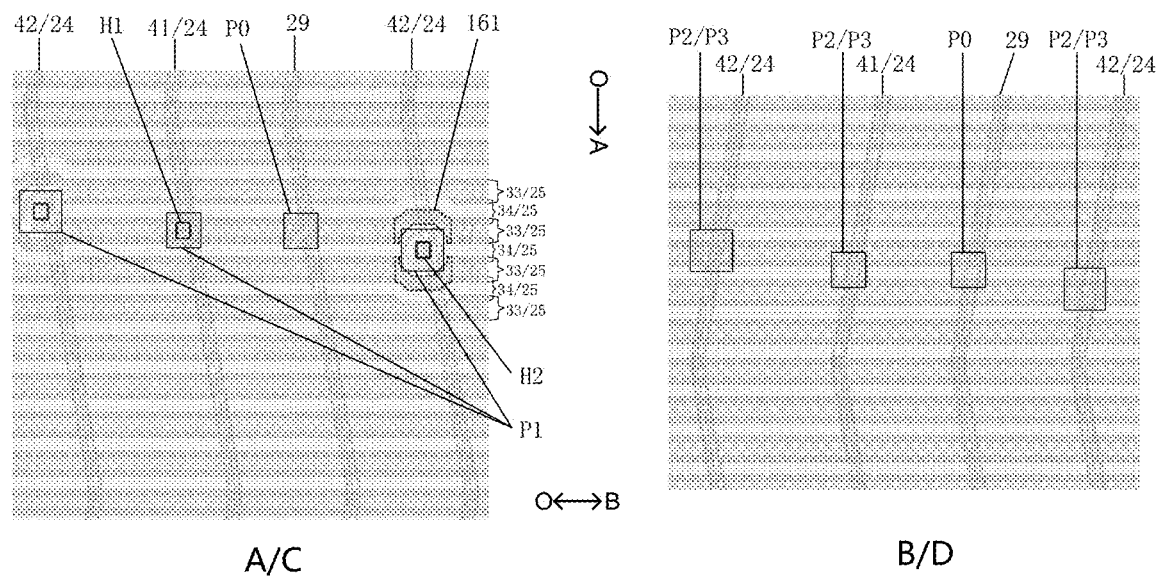
FIG. 16 is a schematic enlarged structural diagram of two regions in a grating regulating device according to an embodiment of the present disclosure.

Optionally, each of the common-signal units 23 comprises a plurality of grating units 20, and each of the driving lines 24 may comprise a plurality of first switching patterns P1, as shown in the left figure in FIG. 16, wherein the left figure in FIG. 16 is an enlarged view of the position A of the dotted-line block in FIG. 11. The plurality of sub-electrodes 25 that are located in the same common-signal unit 23 and have the same serial number are connected to different first switching patterns P1 in the same driving line 24 by via holes.

The orthographic projections of the first switching patterns P1 on the first substrate 1 are located at the intersection positions between the interconnected driving lines 24 and sub-electrodes 25. The first switching patterns P1 on the driving lines 24 and the corresponding sub-electrodes 25 are connected by via holes, which can realize the connection between the driving lines 24 and the corresponding sub-electrodes 25.

Optionally, as shown in FIG. 11, the wiring layer 26 further comprises at least one auxiliary line 29, the auxiliary line 29 is insulated from the sub-electrodes 25, and in the grating region G1, the at least one auxiliary line 29 is arranged in the second direction (the direction OB in FIG. 11).

As shown in the left figure in FIG. 16 or FIG. 11, the auxiliary line 29 is not connected to the sub-electrodes 25. Because all of the auxiliary line 29 and the driving lines 24 are traces arranged in the second direction, by providing the auxiliary line 29, the evenness of the distribution of the traces can be improved, whereby the uniformity of displaying can be improved, to prevent providing the traces merely locally to result in generation of brightness moire patterns.

Further, the traces in the wiring layer 26 (including the auxiliary line 29 and the driving lines 24) may be evenly arranged in the second direction (the direction OB in FIG. 11), which can further improve the uniformity of displaying.

Optionally, as shown in FIG. 11, the auxiliary line 29 is parallel to the driving lines 24 in the grating region G1.

Optionally, as shown in FIG. 11, the auxiliary line 29 is located between at least two neighboring driving lines 24. By providing the auxiliary line 29 between two neighboring driving lines 24, the signal interference between the driving lines 24 located on the two sides of the auxiliary line 29 can be reduced.

Figure 17:
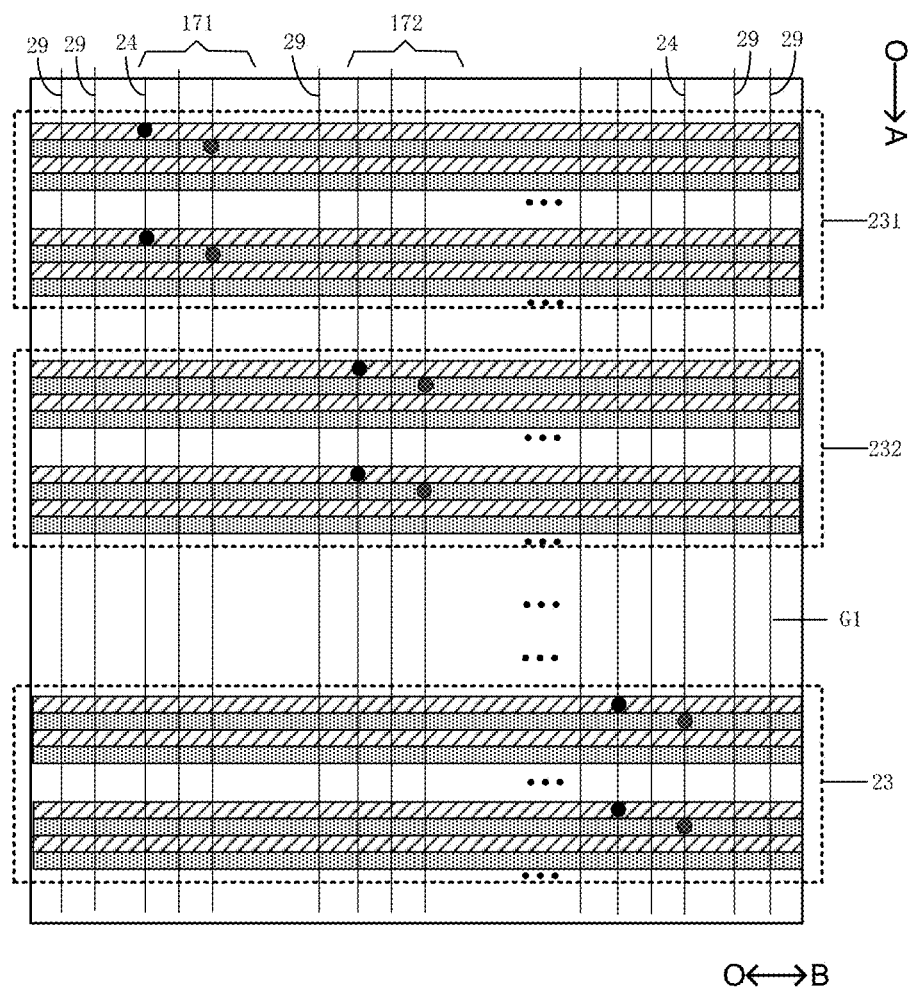
FIG. 17 is a schematic structural diagram of the distribution of an auxiliary line in a grating regulating device according to an embodiment of the present disclosure.

Optionally, as shown in FIG. 17, a plurality of auxiliary lines 29 are located on two opposite sides of the plurality of driving lines 24. Particularly, the auxiliary lines 29 may be located on the two opposite sides of the plurality of driving lines 24 in the second direction. For example, some of the auxiliary lines 29 (two in FIG. 17) are located on the left side of the plurality of driving lines 24 in the grating region G1, and some of the auxiliary lines 29 (two in FIG. 17) may be located on the right side of the plurality of driving lines 24 in the grating region G1.

Optionally, as shown in FIG. 17, the plurality of common-signal units 23 include neighboring first common-signal unit 231 and second common-signal unit 232, a plurality of driving lines 24 that are connected to the first common-signal unit 231 form a first wiring unit 171, a plurality of driving lines 24 that are connected to the second common-signal unit 232 form a second wiring unit 172, and the auxiliary line 29 may be located between the first wiring unit 171 and the second wiring unit 172.

Accordingly, the auxiliary line 29 may serve as the border line between the first wiring unit 171 and the second wiring unit 172, and serve to locate and mark in the fabricating process.

Moreover, the auxiliary line located between the first wiring unit 171 and the second wiring unit 172 can reduce the signal interference between the first wiring unit 171 and the second wiring unit 172.

The first common-signal unit 231 may be any one common-signal unit 23 of the plurality of common-signal units 23. The second common-signal unit 232 is any one neighboring common-signal unit 23 of the first common-signal unit 231.

Optionally, as shown in the left figure in FIG. 16, the auxiliary line 29 and the driving lines 24 located on one side of the auxiliary line 29 have same patterns in the grating region G1.

Particularly, the auxiliary line 29 may be provided with a virtual switching pattern P0. The virtual switching pattern P0 may have the same size and/or position (the position in the first direction (the direction OA)) as those of the first switching pattern P1 located on the driving line 24 on the left side of the auxiliary line 29, as shown in the left figure in FIG. 16, and may also have the same size and/or position (the position in the first direction (the direction OA)) as those of the first switching pattern P1 located on the driving line 24 on the right side of the auxiliary line 29. Moreover, in the first direction, the virtual switching pattern P0 may also be located between the first switching patterns P1 on the two sides, which is not limited in the present disclosure.

Optionally, as shown in FIG. 11, the auxiliary line 29 is connected to a constant-voltage inputting terminal 111, and the constant-voltage inputting terminal 111 is for transmitting a constant-voltage signal to the auxiliary line 29.

As shown in FIG. 11, the auxiliary line 29 is connected to a constant-voltage lead wire 112 located in the non-grating region G2, and the constant-voltage lead wire 112 is connected to a constant-voltage inputting terminal 111 located in the non-grating region G2.

Because the voltage on the auxiliary line 29 is a constant voltage, the auxiliary line 29 can serve to shield interference signals, to prevent signal interference between the driving lines 24 located on their two sides.

Optionally, as shown in FIG. 11, the plurality of common-signal units 23 include a third common-signal unit 233 and a fourth common-signal unit 234, a plurality of driving lines 24 that are connected to the third common-signal unit 233 form a third wiring unit 113, and a plurality of driving lines 24 that are connected to the fourth common-signal unit 234 form a fourth wiring unit 114.

The left figure in FIG. 16 is an enlarged view of the position of the dotted-line block A (corresponding to a part of the fourth wiring unit 114) in FIG. 11. The right figure in FIG. 16 is an enlarged view of the position of the dotted-line block B (corresponding to a part of the third wiring unit 113) in FIG. 11.

As shown in FIG. 16, the driving lines 24 of the third wiring unit 113 comprise second switching patterns P2, and the plurality of second switching patterns P2 located on the third wiring unit 113 and the plurality of first switching patterns P1 located on the fourth wiring unit 114 are of a translation relation in the second direction (the direction OB in the figure). In other words, when the plurality of first switching patterns P1 located on the fourth wiring unit 114 translate to the driving lines 24 in the third wiring unit 113 in the second direction, the plurality of second switching patterns P2 can be obtained.

The second switching patterns P2 are insulated from the sub-electrodes 25; in other words, the second switching patterns P2 are not connected to the sub-electrodes 25.

The left figure in FIG. 16 may also be an enlarged view of the position of the dotted-line block C (corresponding to a part of the third wiring unit 113) in FIG. 11. The right figure in FIG. 16 may also be an enlarged view of the position of the dotted-line block D (corresponding to a part of the fourth wiring unit 114) in FIG. 11.

Likewise, the driving lines 24 of the fourth wiring unit 114 further comprises third switching patterns P3, and the plurality of third switching patterns P3 located on the fourth wiring unit 114 and the plurality of first switching patterns P1 located on the third wiring unit 113 are of a translation relation in the second direction (the direction OB in the figure). In other words, when the plurality of first switching patterns P1 located on the third wiring unit 113 translate to the driving lines 24 in the fourth wiring unit 114 in the second direction, the plurality of third switching patterns P3 can be obtained.

The third switching patterns P3 are insulated from the sub-electrodes 25; in other words, the third switching patterns P3 are not connected to the sub-electrodes 25.

By providing the plurality of second switching patterns P2 on the third wiring unit 113, and providing the plurality of third switching patterns P3 on the fourth wiring unit 114, wherein the second switching patterns P2 and the first switching patterns P1 are of a translation relation in the second direction, and the third switching patterns P3 and the first switching patterns P1 are of a translation relation in the second direction, the evenness of the distribution of the switching patterns (including the first switching patterns P1, the second switching patterns P2 and the third switching patterns P3) on the driving lines 24 can be improved, to prevent macroscopic visibility caused by merely local provision of the switching patterns (for example, merely providing the first switching patterns P1), and prevent moire patterns.

By comparing the left figure and the right figure in FIG. 16, the virtual switching pattern P0 located on the auxiliary line 29 in the fourth wiring unit 114 and the virtual switching pattern P0 located on the auxiliary line 29 in the third wiring unit 113 are of a translation relation in the second direction (the direction OB in the figure).

Optionally, the extension direction of the driving lines located in the third wiring unit 113 and the extension direction of the driving lines located in the fourth wiring unit 114 may be the same or different (as shown in FIG. 16).

Referring to FIG. 11 and FIG. 16, the extension directions of the driving lines in the dotted-line block A and the dotted-line block B are different, and the extension directions of the driving lines in the dotted-line block C and the dotted-line block D are different. In practical applications, the extension directions of the driving lines in the dotted-line block A and the dotted-line block B may be the same, and the extension directions of the driving lines in the dotted-line block C and the dotted-line block D may be the same, which is not limited in the present disclosure.

Optionally, as shown in FIG. 11, all of the switching patterns in the dotted-line block A and a plurality of dotted-line blocks B (including the first switching patterns P1, the second switching patterns P2 and the third switching patterns P3) are of a translation relation in the second direction (the direction OB in the figure), and all of the switching patterns in the dotted-line block C and a plurality of dotted-line blocks D (including the first switching patterns P1, the second switching patterns P2 and the third switching patterns P3) are of a translation relation in the second direction (the direction OB in the figure)..

Optionally, as shown in the left figure in FIG. 16, each of the first sub-electrodes 33 comprises a bent part 161, and the bent part 161 is bent toward the side away from the second via hole H2, to form an avoiding region for avoiding the second via hole H2.

As shown in FIG. 1, the second via hole H2 connecting the second sub-electrode 34 and the second driving line 42 passes through the first sub-electrode layer 31. In order to prevent short circuiting between the first sub-electrode 33 and the second sub-electrode 34, the bent part 161 of the first sub-electrode 33 is bent toward the side away from the second via hole H2, which can increase the distance between the first sub-electrode 33 and the second via hole H2, to form an avoiding region around the second via hole H2, whereby the requirement on the precision of the process control can be reduced.

In a second embodiment, as shown in FIG. 12 to FIG. 15, the plurality of driving lines 24 are located in the non-grating region G2, and the sub-electrodes 25 extend to the non-grating region G2, and are connected to the corresponding driving lines 24 by via holes in the non-grating region G2.

In the present embodiment, providing all of the driving lines 24 in the non-grating region G2 can prevent forming brightness moire patterns in the grating region G1, and prevent affecting the aperture ratio of the displaying device, and can reduce the requirement on the precision of the adhesion between the grating regulating device 100 and the display panel 200.

In order to reduce the provision of the traces and simplify the process, one end or two ends of the first sub-electrode 33 extend to the non-grating region G2, and are connected to the corresponding first driving line 41, and one end or two ends of the second sub-electrode 34 extend to the non-grating region G2, and are connected to the corresponding second driving line 42. Accordingly, without additionally providing lead wires, the connection between the first sub-electrode 33 and the first driving line 41 and the connection between the second sub-electrode 34 and the second driving line 42 can be realized, to be simply and easily implemented.

Optionally, as shown in FIG. 12, the plurality of common-signal units 23 include a fifth common-signal unit 235 and a sixth common-signal unit 236, wherein the sixth common-signal unit 236 is any one of the common-signal units 23 that is located on the side of the fifth common-signal unit 235 that is close to the signal inputting terminal. The orthographic projection on the first substrate 1 of the driving line 24 connected to the fifth common-signal unit 235 and the orthographic projection on the first substrate 1 of at least one of the sub-electrodes 25 in the sixth common-signal unit 236 intersect with each other.

Particularly, as shown in FIG. 12, the orthographic projection on the first substrate 1 of any one of the driving lines 24 (for example, the driving lines marked as L1 or M1 in FIG. 12) connected to the fifth common-signal unit 235 overlaps with all of the orthographic projections on the first substrate 1 of the parts of the plurality of sub-electrodes 25 in the sixth common-signal unit 236 that extend to the non-grating region G2.

Figure 13:
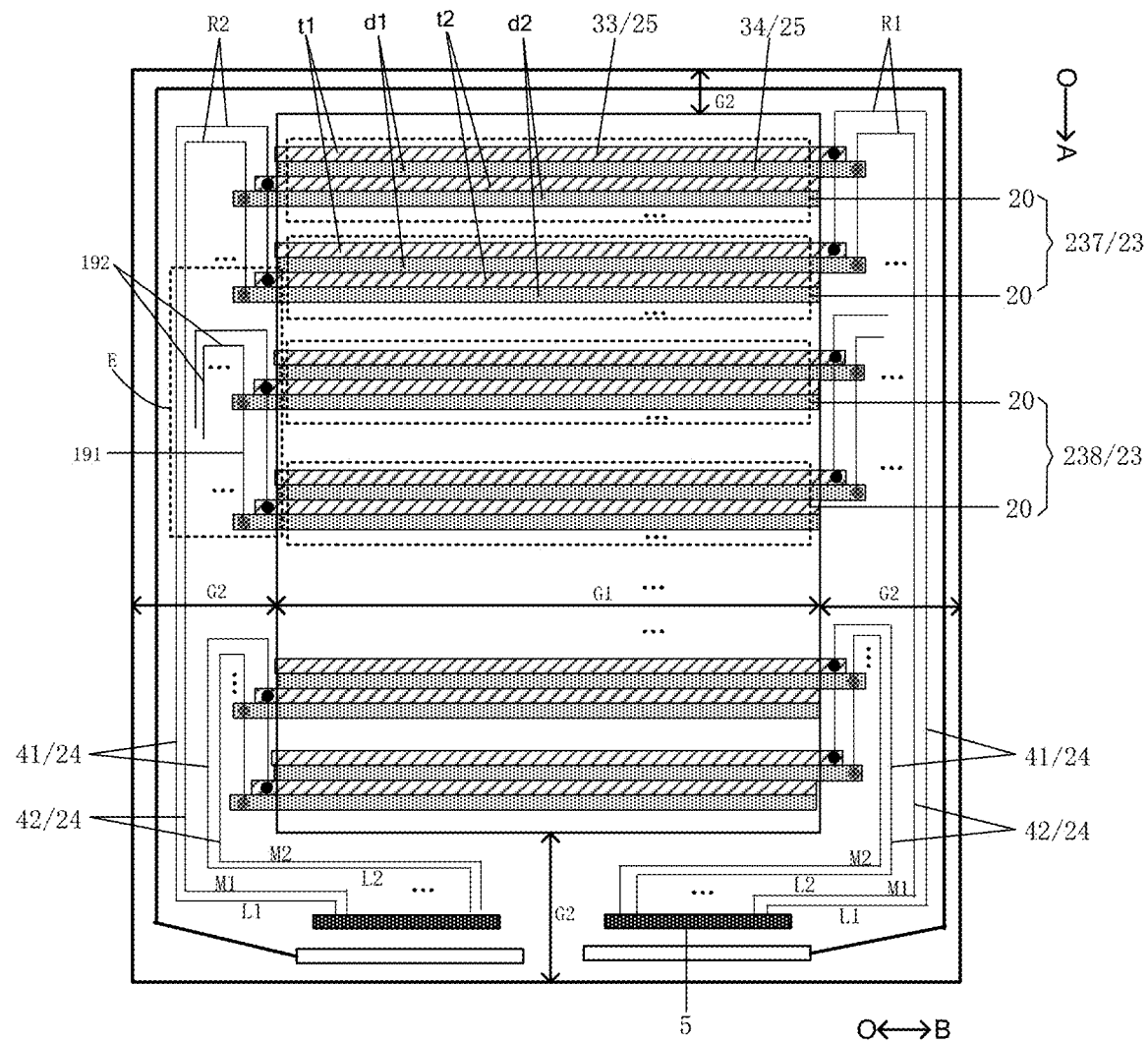
Figure 14:
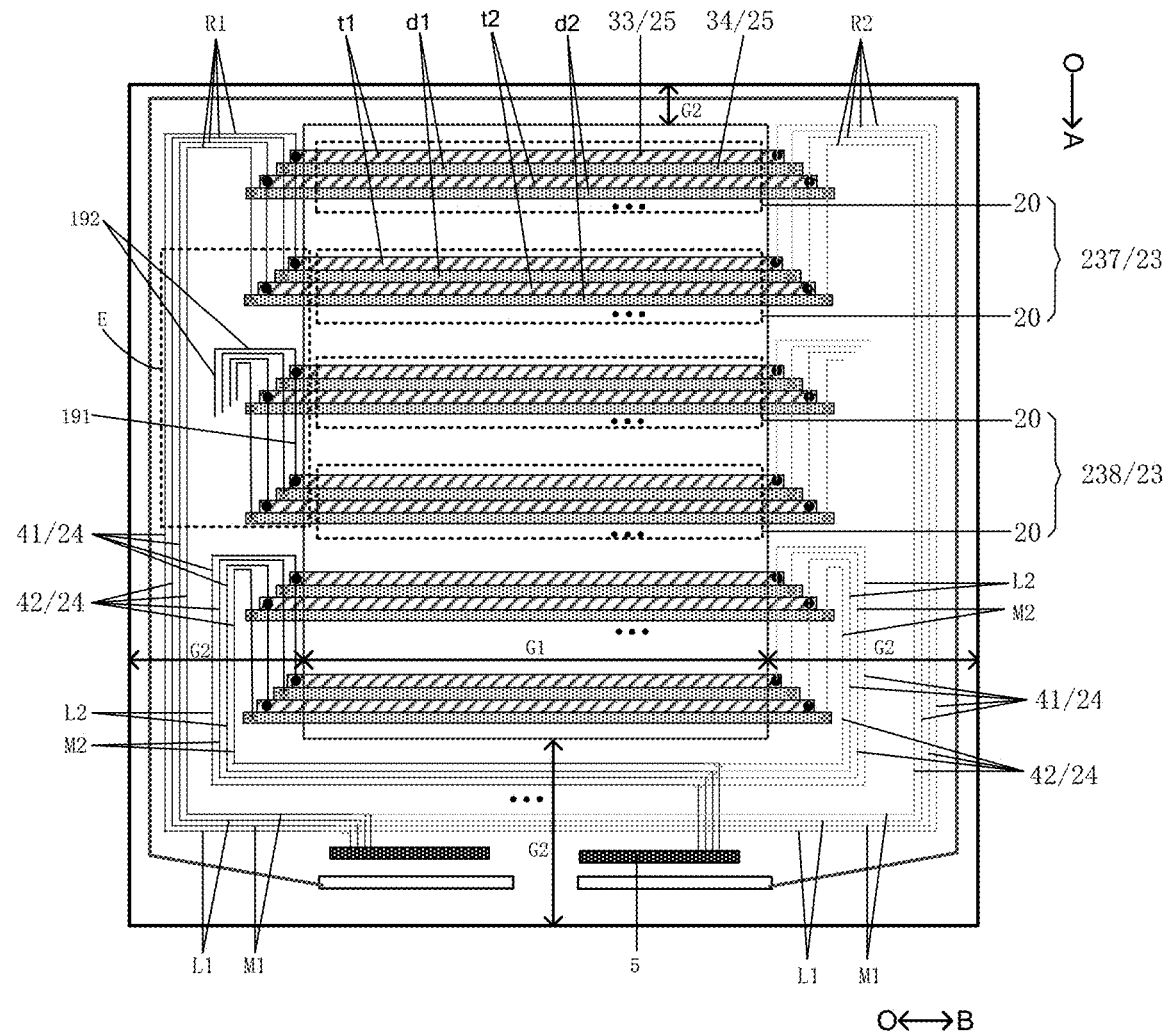
Figure 15:
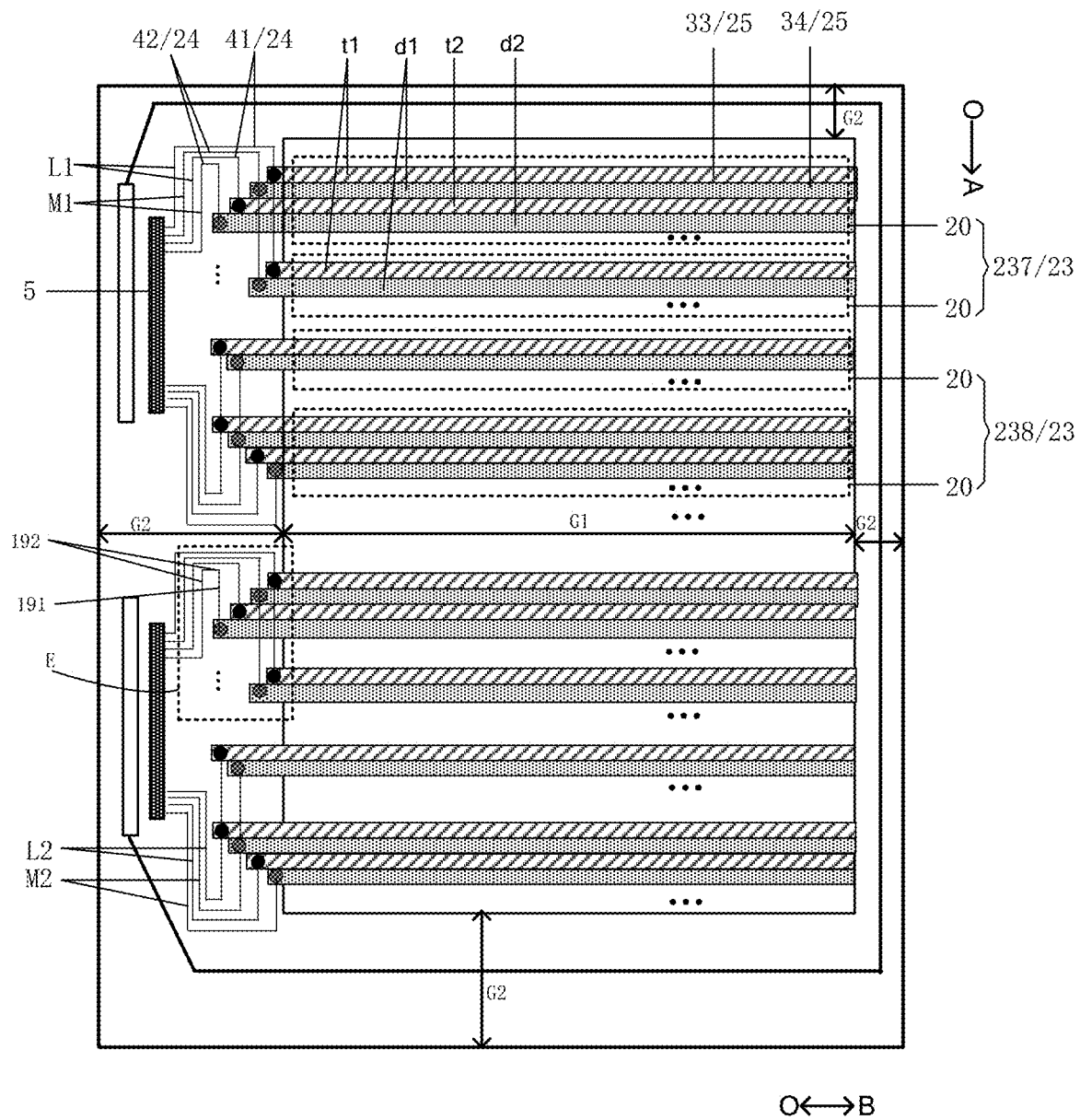

Optionally, as shown in FIG. 13 to FIG. 15, the plurality of common-signal units 23 include a seventh common-signal unit 237 and an eighth common-signal unit 238, wherein the eighth common-signal unit 238 is any one of the plurality of common-signal units 23 other than the seventh common-signal unit 237.

The orthographic projection on the first substrate 1 of the driving line 24 connected to the seventh common-signal unit 237 (for example, the driving lines mark as L1 and M1 in FIGS. 13 to 15) and the orthographic projections on the first substrate 1 of the sub-electrodes 25 in the eighth common-signal unit 238 do not overlap.

Figure 19:
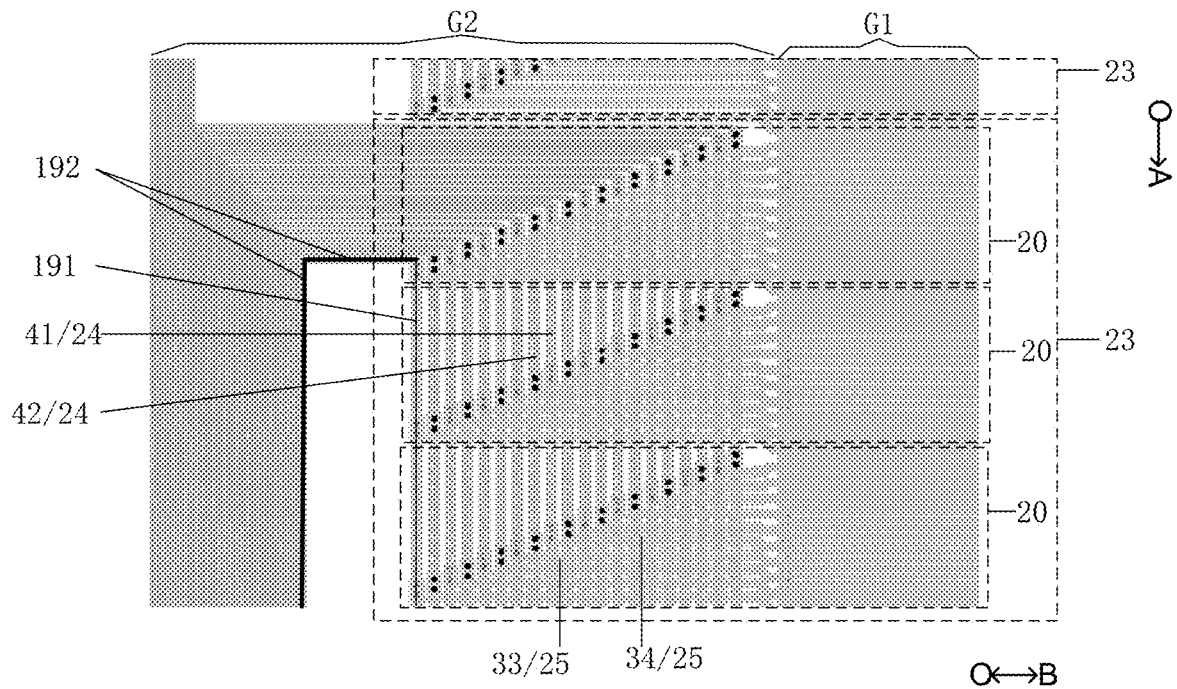
FIG. 19 is a structural diagram of a local design of a grating regulating device according to an embodiment of the present disclosure.

Referring to FIG. 19, FIG. 19 shows a design structure diagram at the position of the dotted-line block E in FIG. 13. As shown in FIG. 19, the driving lines 24 include an extending line 191 (as shown by the thin black line in FIG.

19) and a bending line 192 (as shown by the thick black line in FIG. 19), the extension direction of the extending line 191 is the first direction (the direction OA in the figure), the extending line 191 is connected to the sub-electrodes that are located in the same common-signal unit 23 and have the same serial number by via holes in the non-grating region G2, one end of the bending line 192 is connected to the extending line 191, and the other end is connected to the signal inputting terminal. Accordingly, by using the bending line 192, the connection between the extending line 191 and the signal inputting terminal can be realized.

Optionally, as shown in FIG. 19, the orthographic projections of the bending lines 192 on the first substrate 1 and the orthographic projections of the plurality of sub-electrodes 25 on the first substrate 1 do not overlap. In other words, the orthographic projections of the bending lines 192 on the first substrate 1 do not overlap with the orthographic projection on the first substrate 1 of any one of the sub-electrodes 25.

Optionally, as shown in FIG. 19, the bending line 192 is located on the side of the extending line 191 that is away from the grating region GT.

By reasonably arranging the bending lines 192, it can be realized that the orthographic projections on the first substrate 1 of the driving lines 24 connected to the seventh common-signal unit 237 and the orthographic projections on the first substrate 1 of the sub-electrodes 25 in the eighth common-signal unit 238 do not overlap.

Referring to FIG. 19, in the second direction (the direction OB in the figure), the lengths of the sub-electrodes 25 connected to the same driving line 24 may be equal (as shown in FIG. 19), and may also be unequal, which is not limited in the present disclosure.

As shown in FIG. 13 to FIG. 14, when the eighth common-signal unit 238 is located on the side of the seventh common-signal unit 237 that is close to the signal inputting terminal, the bending lines 192 connected to the seventh common-signal unit 237 are located on the side of the bending lines 192 connected to the eighth common-signal unit 238 that is away from the grating region G1; in other words, the bending lines 192 connected to the seventh common-signal unit 237 are located at the periphery of the bending lines 192 connected to the eighth common-signal unit 238. That can prevent short circuiting between the driving lines.

Optionally, as shown in FIG. 12 to FIG. 14, a plurality of driving lines 24 that are connected to the same common-signal unit 23 are divided into a first wiring group R1 and a second wiring group R2. In other words, the plurality of driving lines 24 in the wiring units are divided into a first wiring group R1 and a second wiring group R2.

The first wiring group R1 may comprise the first driving lines 41, and may also comprise the second driving lines 42. The second wiring group R2 may comprise the first driving lines 41, and may also comprise the second driving lines 42.

Optionally, the first wiring group R1 and the second wiring group R2 are located on two opposite sides of the grating region G1. Further, the first wiring group R1 and the second wiring group R2 are located on the two opposite sides of the grating region G1 in the extension direction of the sub-electrodes 25.

Configuring that the first wiring group R1 and the second wiring group R2 are located on two opposite sides of the grating region G1 can increase the wiring room of the driving lines 24, increase the width of the driving lines 24, reduce the transmission resistance of the driving lines 24, and improve the driving capacity and the response speed, and can prevent mutual interference caused by an extremely compact traces provision.

As shown in FIG. 12, the extension direction of the sub-electrodes 25 is the vertical direction, and therefore the first wiring group R1 and the second wiring group R2 are located on the upper side and the lower side of the grating region G1.

As shown in FIG. 13 and FIG. 14, the extension direction of the sub-electrodes 25 is the horizontal direction, and therefore the first wiring group R1 and the second wiring group R2 are located on the left side and the right side of the grating region G1.

In FIG. 12, the plurality of driving lines 24 connected to the first common-signal unit 235 on the left include a plurality of first driving lines 41 marked as L1, and a plurality of second driving lines 42 marked as M1. The corresponding first wiring group R1 comprises the first driving lines 41 marked as L1 and the second driving lines 42 marked as M1 that are located below the grating region G1. The corresponding second wiring group R2 comprises the first driving lines 41 marked as L1 and the second driving lines 42 marked as M1 that are located above the grating region G1.

In FIG. 12, the plurality of driving lines 24 connected to the first common-signal unit 236 on the right include a plurality of first driving lines 41 marked as L2, and a plurality of second driving lines 42 marked as M2. The corresponding first wiring group R1 comprises the first driving lines 41 marked as L2 and the second driving lines 42 marked as M2 that are located below the grating region G1. The corresponding second wiring group R2 comprises the first driving lines 41 marked as L2 and the second driving lines 42 marked as M2 that are located above the grating region G1.

In FIG. 13, the plurality of driving lines 24 connected to the first common-signal unit 237 on the upper side include a plurality of first driving lines 41 marked as L1, and a plurality of second driving lines 42 marked as M1. The corresponding first wiring group R1 comprises the first driving lines 41 marked as L1 and the second driving lines 42 marked as M1 that are located on the right side of the grating region G1. The corresponding second wiring group R2 comprises the first driving lines 41 marked as L1 and the second driving lines 42 marked as M1 that are located on the left side of the grating region G1.

In FIG. 14, the plurality of driving lines 24 connected to the first common-signal unit 237 on the upper side include a plurality of first driving lines 41 marked as L1, and a plurality of second driving lines 42 marked as M1. The corresponding first wiring group R1 comprises the first driving lines 41 marked as L1 and the second driving lines 42 marked as M1 that are located on the left side of the grating region G1. The corresponding second wiring group R2 comprises the first driving lines 41 marked as L1 and the second driving lines 42 marked as M1 that are located on the right side of the grating region G1.

Optionally, in order to sufficiently utilize each of the driving chips 5 and facilitate designing, as shown in FIGS. 12 to 14, the quantity of the driving lines comprised by the first wiring group R1 and the quantity of the driving lines comprised by the second wiring group R2 are equal.

The first wiring group R1 (for example, the first driving lines L1 and the second driving lines M1 below the grating region G1 in FIG. 12) and the second wiring group R2 (for example, the first driving lines L1 and the second driving lines M1 above the grating region G1 in FIG. 12) may be of mirror symmetry. Moreover, because the sub-electrodes that are connected to the first wiring group R1 and the second wiring group R2 are different, the first wiring group R1 and the second wiring group R2 may be dislocated in the first direction.

In a particular implementation, the driving lines 24 in the first wiring group R1 and the driving lines 24 in the second wiring group R2 may be located in the same film layer (as shown in FIGS. 12 to 13), and may also be located in different film layers (as shown in FIG. 14, and will be described in detail below).

In a particular implementation, the signal inputting terminal may be provided in the same layer as or provided in a different layer from the driving lines 24 in the first wiring group R1. The signal inputting terminal may be provided in the same layer as or provided in a different layer from the driving lines 24 in the second wiring group R2.

Optionally, the first wiring group R1 and the second wiring group R2 may be connected to the same or different driving chips 5.

As shown in FIG. 12, the first wiring group R1 located below the grating region G1 is connected to one driving chip 5, and the second wiring group R2 located above the grating region G1 is connected to another driving chip 5.

As shown in FIG. 13, the first wiring group R1 located on the right side of the grating region G1 is connected to one driving chip 5, and the second wiring group R2 located on the left side of the grating region G1 is connected to another driving chip 5.

As shown in FIG. 14, the first wiring group R1 located on the left side of the grating region G1 and the second wiring group R2 located on the right side of the grating region G1 are connected to the same driving chip 5. Particularly, the driving lines in the first wiring group R1 and the driving lines in the second wiring group R2, before connecting the signal inputting terminal, are firstly connected by via holes, and subsequently connected to one driving chip 5.

Optionally, as shown in FIG. 12 or FIG. 13, the plurality of sub-electrodes 25 include first sub-electrodes 33 and second sub-electrodes 34 that are alternately arranged in the first direction (the direction OA), the plurality of first sub-electrodes 33 located in the same grating unit 20 are ordered in the first direction (the direction OA), and the plurality of second sub-electrodes 34 located in the same grating unit 20 are ordered in the first direction (the direction OA).

As shown in FIG. 12 or FIG. 13, a plurality of first sub-electrodes 33 are ordered in the first direction (the direction OA) (the first sub-electrodes 33 whose serial numbers are 1, 2, 3 . . . and n are marked as t1, t2, t3 . . . and tn respectively), and a plurality of second sub-electrodes 34 are ordered in the first direction (the direction OA) (the second sub-electrodes 34 whose serial numbers are 1, 2, 3 . . . and n are marked as d1, d2, d3 . . . and dn).

In order to further alleviate the mutual interference between the neighboring traces, as shown in FIG. 12 or FIG. 13, the first sub-electrodes 33 and the second sub-electrodes 34 whose serial number is an odd number are correspondingly connected to the driving lines 24 in the first wiring group R1. The first sub-electrodes 33 and the second sub-electrodes 34 whose serial number is an even number are correspondingly connected to the driving lines 24 in the second wiring group R2.

As shown in FIG. 12 or 13, in each of the common-signal units 23, the first sub-electrodes 33 whose serial number is an odd number (for example, those marked as t1, t3, t5 and so on) are connected to the first driving lines 41 in the first wiring group R1, and the first sub-electrodes 33 whose serial number is an even number (for example, those marked as t2, t4, t6 and so on) are connected to the first driving lines 41 in the second wiring group R2.

As shown in FIG. 12 or 13, in each of the common-signal units 23, the second sub-electrodes 34 whose serial number is an odd number (for example, those marked as d1, d3, d5 and so on) are connected to the second driving lines 42 in the first wiring group R1, and the second sub-electrodes 34 whose serial number is an even number (for example, those marked as d2, d4, d6 and so on) are connected to the second driving lines 42 in the second wiring group R2.

As shown in FIG. 12 or 13, each of the first sub-electrodes 33 and the second sub-electrodes 34 comprises opposite first end (the lower ends of the sub-electrodes 25 in FIG. 12, and the right ends of the sub-electrodes 25 in FIG. 13) and second end (the upper ends of the sub-electrodes 25 in FIG. 12, and the right ends of the sub-electrodes 25 in FIG. 13). In each of the grating units 20, the first ends of the first sub-electrodes 33 and the second sub-electrodes 34 whose serial number is an odd number extend to the non-grating region G2, and the second ends of the first sub-electrodes 33 and the second sub-electrodes 34 whose serial number is an even number extend to the non-grating region G2, so as to realize that the first sub-electrodes 33 whose serial number is an odd number are connected to the first driving lines 41 in the first wiring group R1, and the first sub-electrodes 33 whose serial number is an even number are connected to the first driving lines 41 in the second wiring group R2. At the same time, it is realized that the second sub-electrodes 34 whose serial number is an odd number are connected to the second driving lines 42 in the first wiring group R1, and the second sub-electrodes 34 whose serial number is an even number are connected to the second driving lines 42 in the second wiring group R2.

In FIG. 13, each of the grating units 20 comprises 40 sub-electrodes, among which 20 sub-electrodes extend to the left side of the grating region G1 (as shown in FIG. 19), and the other 20 sub-electrodes extend to the right side of the grating region G1 (not shown in FIG. 19).

Optionally, as shown in FIG. 14, each of the sub-electrodes 25 is connected to two driving lines 24, and the two driving lines 24 are individually located in the first wiring group R1 and the second wiring group R2.

As shown in FIG. 14, the two ends of each of the sub-electrodes 25 extend to the non-grating region G2, i.e., the left side and the right side of the grating region G1, the part of the sub-electrode 25 that extends to the left side of the grating region G1 is connected to the corresponding driving line 24 in the first wiring group R1 by a via hole, and the part of the sub-electrode 25 that extends to the right side of the grating region G1 is connected to the corresponding driving line 24 in the second wiring group R2 by a via hole.

Because each of the sub-electrodes 25 is connected to two driving lines 24, and the two driving lines 24 are located on the two opposite sides of the grating region G1, double-side driving of the sub-electrodes 25 can be realized, to improve the driving capacity of the sub-electrodes 25, and shorten the duration for charging and discharging.

The design structure diagram at the position of the dotted-line block E in FIG. 14 may also refer to FIG. 19. The difference is that, in each of the grating units 20 shown in FIG. 19 merely 20 sub-electrodes extend to the left side of the grating region G1, while in each of the grating units 20 shown in FIG. 14 the two ends of each of the sub-electrodes extend to the left side and the right side of the grating region G1. In other words, when the grating unit 20 comprises 40 sub-electrodes (as shown in FIG. 19), all of the 40 sub-electrodes extend to the left side of the grating region G1.

As shown in FIG. 14, the two driving lines 24 connected to the same sub-electrode 25 may be connected to the same signal inputting terminal. Accordingly, it can be ensured that the signals inputted into the two driving lines 24 connected to the same sub-electrode 25 are synchronous, to shorten the duration for charging and discharging.

In a particular implementation, the first wiring group R1 and the second wiring group R2 may be located at different film layers. As an example, as shown in FIG. 18, the wiring layer 26 may further comprise: a first wiring layer 51, a third insulating layer 52 and a second wiring layer 53 that are arranged in stack.

Figure 18:
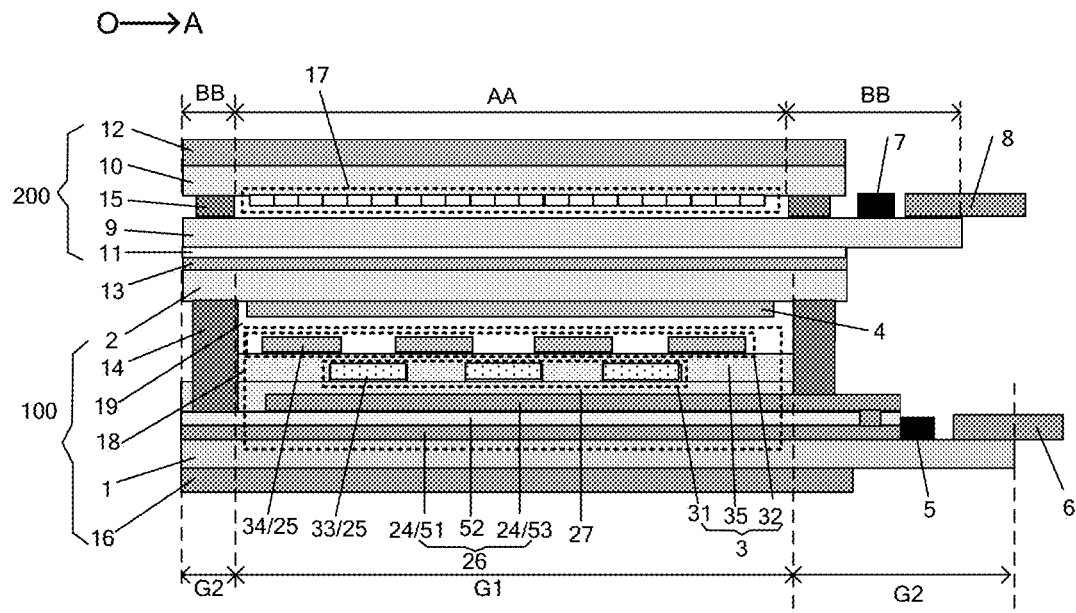
FIG. 18 is a schematic sectional structural diagram of a second type of displaying device according to an embodiment of the present disclosure.

As shown in FIG. 18, the driving lines 24 in the first wiring group R1 and the signal inputting terminal may be located at the first wiring layer 51 and be interconnected, the driving lines 24 in the second wiring group R2 may be located at the second wiring layer 53, and the two driving lines 24 connected to the same sub-electrode 25 are connected by a via hole in the non-grating region G2.

In a particular implementation, the plurality of driving lines 24 in the first wiring group R1 may be connected to different signal inputting terminals. As shown in FIG. 14, the two driving lines 24 connected to the same sub-electrode 25 are connected to the signal inputting terminal by via holes provided in the third insulating layer 52 in the grating region G1, so as to ensure that the two driving lines 24 connected to the same sub-electrode 25 are connected to the same signal inputting terminal.

Optionally, as shown in FIG. 12 to FIG. 14, the sub-electrodes 25 extend to a first side and/or a second side of the grating region G1, and are connected to the corresponding driving lines 24, and the signal inputting terminal is located on a third side of the grating region G1.

Both of the first side and the second side are a side of the grating region G1 in the extension direction of the sub-electrodes 25. The third side is a side different from the first side or the second side.

As shown in FIG. 12, the extension direction of the sub-electrodes 25 is the vertical direction, and therefore the first side and the second side are the upper side and the lower side of the grating region G1. Correspondingly, the third side may be the left side or the right side of the grating region G1.

As shown in FIG. 13 to FIG. 14, the extension direction of the sub-electrodes 25 is the horizontal direction, and therefore the first side and the second side are the left side and the right side of the grating region G1. Correspondingly, the third side may be the upper side or the lower side of the grating region G1.

As shown in FIG. 12, the first sub-electrodes 33 and the second sub-electrodes 34 whose serial number is an odd number extend to the lower side of the grating region G1, the first sub-electrodes 33 and the second sub-electrodes 34 whose serial number is an even number extend to the upper side of the grating region G1, and the signal inputting terminal is located on the right side of the grating region G1.

As shown in FIG. 13, the first sub-electrodes 33 and the second sub-electrodes 34 whose serial number is an odd number extend to the right side of the grating region G1, the first sub-electrodes 33 and the second sub-electrodes 34 whose serial number is an even number extend to the left side of the grating region G1, and the signal inputting terminal is located on the lower side of the grating region G1.

As shown in FIG. 14, the sub-electrodes 25 extend to the left side and the right side of the grating region G1, and the signal inputting terminal is located on the lower side of the grating region G1.

Optionally, as shown in FIG. 15, the interconnected driving lines 24 and signal inputting terminal are located on the same side of the grating region G1, wherein the same side refers to any one side of the grating region G1 in the extension direction of the sub-electrodes 25.

As shown in FIG. 15, the extension direction of the sub-electrodes 25 is the horizontal direction, and therefore the interconnected driving lines 24 and signal inputting terminal may be located on the left side or the right side of the grating region G1.

In FIG. 15, the sub-electrodes 25 extend to the left side of the grating region G1, and are correspondingly connected to the driving lines located on the left side of the grating region G1, and the signal inputting terminal is also located on the left side of the grating region G1.

Because the interconnected driving lines 24 and signal inputting terminal are located on the same side of the grating region G1, that, in an aspect, can reduce the length of the driving lines 24, reduce the sheet resistance, improve the driving capacity, and shorten the duration for charging and discharging, and, in another aspect, can realize narrow border frames on the three sides.

The design structure diagram at the position of the dotted-line block E in FIG. 15 may also refer to FIG. 19. The difference is that, in each of the grating units 20 shown in FIG. 19 merely 20 sub-electrodes extend to the left side of the grating region G1, while in each of the grating units 20 shown in FIG. 15 all of the sub-electrodes extend to the left side of the grating region G1. In other words, when the grating unit 20 comprises 40 sub-electrodes (as shown in FIG. 19), all of the 40 sub-electrodes extend to the left side of the grating region G1.

Optionally, the plurality of driving lines 24 are connected to different signal inputting terminals. That ensures that the different driving lines 24 can be inputted with different driving signals, to facilitate to realize precise driving.

Optionally, in order to supply the driving signal to the first driving lines 41 and the second driving lines 42, the grating regulating device 100 further comprises at least one driving chip 5.

In FIG. 11 to FIG. 15, a plurality of signal inputting terminals are provided in the region covered by the driving chip 5. The signal inputting terminals are used to bond the driving chips 5, and the signal inputting terminals and the channels of the driving chips 5 correspond one to one.

The particular quantity of the driving chips 5 is not limited herein. As an example, the device may, as shown in FIG. 2a, comprise one driving chip 5, or, as shown in FIGS. 11 to 15, comprise two driving chips 5. The driving chip 5 may be directly connected to the first driving lines 41 and the second driving lines 42, thereby providing a driving-voltage signal. As shown in FIG. 1, the grating regulating device 100 further comprises an FPC (Flexible Printed Circuit) 6, and the driving chip 5 may be bonded to the FPC 6.

In one or more embodiments, in order to increase the light-emission amount of the grating regulating device 100, the materials of the second electrode layer 4, the first sub-electrodes 33 and the second sub-electrodes 34 comprise a transparent electrically conductive material. As an example, the transparent electrically conductive material may comprise a metal oxide such as Indium Tin Oxide (ITO), and may also be a metal material having a high transparency, such as a silver nanowire. By using the metal material, the sheet resistance can be reduced.

It should be noted that, in the practical process, because of the limitation by the process conditions or other factors, the above-described same features may not be completely the same, and some errors might emerge. Therefore, the relation of sameness between the above-described features is merely required to substantially satisfy the above conditions, all of which fall in the protection scope of the present disclosure. For example, the above-described sameness may be sameness permitted in a permissible error range.

The present disclosure further provides a displaying device. As shown in FIG. 1, the displaying device comprises a display panel 200 and the grating regulating device 100 stated above. The grating regulating device 100 and the display panel 200 face each other.

A person skilled in the art can understand that the displaying device has the advantages of the grating regulating device 100 described above, and can realize 3D displaying.

The grating regulating device 100 may be provided on the light exiting side of the display panel 200, in which case the grating regulating device 100 may be referred to as a front-placed grating. Alternatively, as shown in FIG. 1, the grating regulating device 100 may be provided on the shadow side of the display panel 200, in which case the grating regulating device 100 may be referred to as a rear-placed grating, which is not limited herein.

The type of the display panel 200 is not limited, and its type may be liquid-crystal display panels 200 such as the TN (Twisted Nematic) type, the VA (Vertical Alignment) type, the IPS (In-Plane Switching) type and the ADS (Advanced Super Dimension Switch) type, which is not limited herein. Furthermore, if the display panel 200 is a liquid-crystal display panel 200, then the 3D displaying device may further comprise a backlight module, to provide backlight. If the grating regulating device 100 is provided on the shadow side of the display panel 200, the backlight module may be provided on the shadow side of the grating regulating device 100. Certainly, if the grating regulating device 100 is provided on the light exiting side of the display panel 200, the backlight module may be provided on the shadow side of the display panel 200.

The displaying device can highly reduce the interference in the movement of the watcher, thereby highly improving the user experience and the product quality.

Optionally, the display panel 200 comprises a touch-controlled display panel 200. As shown in FIG. 1, the grating regulating device 100 is provided on the shadow side of the display panel 200. That can prevent the influence on the effect of touch controlling by the grating regulating device 100, thereby improving the quality of touch controlling.

The touch-controlled display panel 200 may employ the TDDI (touch controlling and displaying integration) touch-controlling technique. The touch-controlling component is not limited herein, and may be particularly obtained according to the related art.

Optionally, in order to realize the effect of 3D displaying, as shown in FIG. 1, the grating regulating device 100 comprises a grating region G1, and a non-grating region G2 located on at least one side of the grating region G1. The display panel 200 comprises a displaying region AA and a non-displaying region BB located on at least one side of the displaying region AA. The orthographic projection of the grating region G1 on the plane where the display panel is located covers the displaying region AA.

Optionally, as shown in FIG. 11, in the grating region G1, a plurality of driving lines 24 are arranged in the second direction, the orthographic projections of the driving lines 24 on the first substrate 1 and the orthographic projections of the plurality of sub-electrodes 25 on the first substrate 1 intersect with each other, and the interconnected driving lines 24 and sub-electrodes 25 are connected by via holes at the positions where they intersect.

Figure 20:
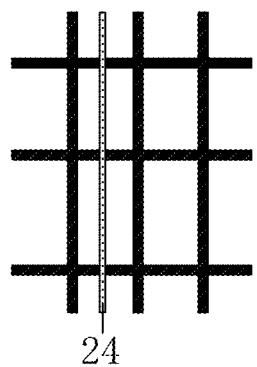
FIG. 20 and FIG. 21 are two schematic structural diagrams of the matching between a grating regulating device and a display panel according to an embodiment of the present disclosure.
Figure 21:
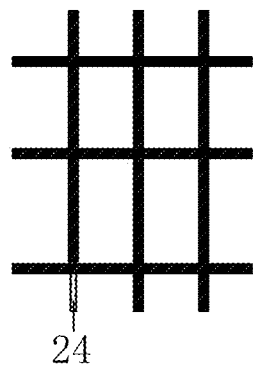

Correspondingly, referring to FIG. 20 and FIG. 21, the displaying region comprises a plurality of pixel opening regions that are arranged in an array in a row direction and a column direction, and non-opening regions (the black-filled regions in FIG. 20 and FIG. 21) surrounding the pixel opening regions. In the row direction, the orthographic projections of the driving lines 24 on the plane where the display panel is located are located in the areas of the pixel opening regions, or the orthographic projections of the driving lines 24 on the plane where the display panel is located are located in the areas of the non-opening regions.

As shown in FIG. 20, the orthographic projections of the driving lines 24 on the plane where the display panel is located are located in the areas of the pixel opening regions; in other words, the orthographic projections of the driving lines 24 on the display panel 200 pass through the plurality of pixel opening regions in the column direction. Such a configuration can reduce the requirement on the precision of the adhesion between the grating regulating device 100 and the display panel 200.

As shown in FIG. 21, the orthographic projections of the driving lines 24 on the plane where the display panel is located are located in the areas of the non-opening regions. As an example, the orthographic projections of the driving lines 24 on the display panel 200 may be located in the areas of data lines. The data lines are used to transmit displaying signals, to control the pixel openings to emit light or not emit light. By configuring that the orthographic projections of the driving lines 24 on the plane where the display panel 200 is located may be located in the areas of the non-opening regions, the aperture ratio can be increased. In such a case, all of the second switching patterns P2, the third switching patterns P3 and the virtual switching pattern P0 on the driving lines 24 can be omitted.

In the practical fabricating process, in order to ensure that the orthographic projections of the driving lines 24 on the plane where the display panel 200 is located are located in the areas of the data lines, the precision of the adhesion between the grating regulating device 100 and the display panel 200 may be controlled in 5 μm, to prevent affecting the aperture ratio.

Optionally, the displaying device further comprises a light bar provided on the shadow side of the display panel. All of the orthographic projection of the light bar on the plane where the display panel is located and the orthographic projections of the interconnected driving lines 24 and signal inputting terminal on the plane where the display panel is located are located on the same side of the displaying region, and the same side refers to any one side of the displaying region in the extension direction of the sub-electrodes 25.

Because the interconnected driving lines 24 and signal inputting terminal are located on the same side (the left side or the right side) of the displaying region, and correspond to the longer lateral side of the displaying region, by placing the light bar on the longer lateral side (the longer side where the signal inputting terminal is located or the opposite side), the quantity of the LED lights in the light bar can be increased, to increase the brightness of the displaying device.

The displaying region of the display panel 200 is used to provide the pixels, to implement the displaying. The non-displaying region is used to provide the driving circuit and so on.

Optionally, in order to simplify the process, as shown in FIG. 1, the grating regulating device 100 comprises the first substrate 1 and the second substrate 2 that face each other, and the display panel 200 comprises a third substrate 9 and a fourth substrate 10 that face each other.

The second substrate 2 and the third substrate 9 are adhered; for example, they may be adhered by using the double-sided adhesive tape 13 shown in FIG. 1. Moreover, in order to prevent the affection by external stray light, as shown in FIG. 1, a first polarizing layer 16 may be provided on the outer side of the first substrate 1 of the grating regulating device 100. If the display panel 200 is a liquid-crystal display panel 200, then, as shown in FIG. 1, the display panel 200 may further comprise a second polarizing layer 11 and a third polarizing layer 12, wherein the second polarizing layer 11 is provided on the side of the third substrate 9 that is close to the second substrate 2, and the third polarizing layer 12 is provided on the side of the fourth substrate 10 that is away from the third substrate 9.

Certainly, as shown in FIG. 1, the display panel 200 may further comprise components such as a color-film layer 17, a first block sealing adhesive 15, a driving chip 57 and a circuit board 8, and the grating regulating device 100 may further comprise components such as a second block sealing adhesive 14. Merely the contents that are relevant to the inventiveness are described herein, and the other components may be obtained with reference to the related art.

Optionally, in order to track the movement of the human eyes in real time, the 3D displaying device further comprises a shooting unit. The grating regulating device 100 is connected to the shooting unit, and is configured to, according to the information shot by the shooting unit, adjust the opening position and/or the aperture ratio of the grating unit 20 of the grating regulating device 100.

The shooting unit may comprise a camera. The grating regulating device 100 can, according to information shot by the shooting unit, by using a relevant eyeball tracking technique, parse data such as the human-eye positions, and adjust the opening position and/or the aperture ratio of the grating unit 20 in real time, so as to match the positions of the viewpoints after movement to the largest extent, thereby reducing the interference in the movement, to improve the user experience and the product quality.

The present disclosure further provides a 3D displaying device. As shown in FIG. 1, the 3D displaying device comprises a display panel 200 and the grating regulating device 100 stated above. The grating regulating device 100 and the display panel 200 face each other.

A person skilled in the art can understand that the 3D displaying device has the advantages of the grating regulating device 100 described above, and can realize 3D displaying.

The 3D displaying device can highly reduce the interference in the movement, thereby highly improving the user experience and the product quality.

Moreover, by using the grating regulating device to form the 3D displaying device, its advantages are that the free switching between the 2D displaying and the 3D displaying can be realized, and that, in the 2D displaying, the grating units in the grating regulating device are in the light-transmitting state, to have little influence on the transmittance of the 2D displaying.

The grating regulating device may be provided on the light exiting side of the display panel, in which case the grating regulating device may be referred to as a front-placed grating.

Alternatively, as shown in FIG. 1, the grating regulating device 100 may be provided on the shadow side of the display panel 200, in which case the grating regulating device may be referred to as a rear-placed grating, which is not limited herein.

The type of the display panel is not limited, and its type may be liquid-crystal display panels such as the TN (Twisted Nematic) type, the VA (Vertical Alignment) type, the IPS (In-Plane Switching) type and the ADS (Advanced Super Dimension Switch) type, which is not limited herein. Furthermore, if the display panel is a liquid-crystal display panel, then the 3D displaying device may further comprise a backlight module, to provide backlight. If the grating regulating device is provided on the shadow side of the display panel, the backlight module may be provided on the shadow side of the grating regulating device. Certainly, if the grating regulating device is provided on the light exiting side of the display panel, the backlight module may be provided on the shadow side of the display panel.

Optionally, the 3D displaying device comprises an eyeball tracking module, and the eyeball tracking module is configured to acquire a watching distance. Correspondingly, the grating regulating device 100 may be connected to the eyeball tracking module, and is further configured to, according to the watching distance, adjust the opening position and/or the aperture ratio of the grating unit.

The eyeball tracking module may comprise a camera. The grating regulating device can, according to information shot by the eyeball tracking module, by using a relevant eyeball tracking technique, parse data such as the eyeball positions, and, accordingly, according to the data such as the eyeball positions, acquire the watching distance, and adjust the opening position and/or the aperture ratio of the grating unit in real time, so as to match the positions of the viewpoints after movement to the largest extent, thereby reducing the interference in the movement, to improve the user experience and the product quality.

In the present disclosure, the meaning of "plurality of" is "two or more", and the meaning of "at least one" is "one or more", unless explicitly and particularly defined otherwise.

In the present disclosure, the terms that indicate orientation or position relations, such as "upper" and "lower", are based on the orientation or position relations shown in the drawings, and are merely for conveniently describing the present disclosure and simplifying the description, rather than indicating or implying that the device or element must have the specific orientation and be constructed and operated according to the specific orientation. Therefore, they should not be construed as a limitation on the present disclosure.

In the claims, any reference signs between parentheses should not be construed as limiting the claims.

In the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The grating regulating device and the displaying device according to the present disclosure has been described in detail above. The principle and the embodiments of the present disclosure are described herein with reference to the particular examples, and the description of the above embodiments is merely intended to facilitate to comprehend the method according to the present disclosure and its core concept.

The embodiments of the description are described in the mode of progression, each of the embodiments emphatically describes the differences from the other embodiments, and the same or similar parts of the embodiments may refer to each other.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

The present disclosure aims at encompassing any variations, uses or adaptative alternations of the present disclosure, wherein those variations, uses or adaptative alternations follow the general principle of the present disclosure and include common knowledge or common technical means in the art that are not disclosed by the present disclosure. The description and the embodiments are merely deemed as exemplary, and the true scope and spirit of the present disclosure are presented by the appended claims.

The invention claimed is:

1. A grating regulating device comprising a first substrate, a conductive layer, a dielectric layer and a second substrate that are arranged in stack, wherein
the conductive layer comprises a wiring layer, a first insulating layer and a first electrode layer that are arranged in stack, the wiring layer comprises a plurality of driving lines, and the first electrode layer comprises a plurality of sub-electrodes that are arranged in a first direction;
each of the plurality of driving lines is connected to a signal inputting terminal and one of the plurality of sub-electrodes, to transmit a driving signal inputted by the signal inputting terminal to the sub-electrodes, and the sub-electrodes are for, by the effect of the driving signal, driving corresponding positions of the dielectric layer to be light-transmitting or opaque;
the grating regulating device comprises a grating region, the grating region comprises a plurality of common-signal units, each of the plurality of common-signal units comprises at least one grating unit, the grating unit comprises the plurality of sub-electrodes, and the plurality of sub-electrodes located in the same grating unit are connected to different driving lines;
the plurality of sub-electrodes located in the same grating unit are ordered in the first direction, and the sub-electrodes that are located in a same common-signal unit and have a same serial number are connected to a same driving line;
in the grating region, the plurality of driving lines are arranged in a second direction, and orthographic projections of the plurality of driving lines on the first substrate and orthographic projections of the plurality of sub-electrodes on the first substrate intersect with each other; and
the wiring layer further comprises at least one auxiliary line, the auxiliary line is insulated from the sub-electrodes, and in the grating region, the at least one auxiliary line is arranged in the second direction.

2. The grating regulating device according to claim 1, wherein each of the plurality of common-signal units comprises a plurality of grating units, and each of the plurality of driving lines comprises a plurality of first switching patterns; and
the plurality of sub-electrodes that are located in a same common-signal unit and have a same serial number are connected to different first switching patterns in a same driving line by via holes.

3. The grating regulating device according to claim 2, wherein the plurality of common-signal units comprise a third common-signal unit and a fourth common-signal unit, a plurality of driving lines that are connected to the third common-signal unit are a third wiring unit, and a plurality of driving lines that are connected to the fourth common-signal unit are a fourth wiring unit;
the driving lines of the third wiring unit comprise a plurality of second switching patterns, the plurality of second switching patterns located on the third wiring unit and the plurality of first switching patterns located on the fourth wiring unit are of a translation relation in the second direction, and the second switching patterns are insulated from the sub-electrodes; and
the driving lines of the fourth wiring unit comprise a plurality of third switching patterns, the plurality of third switching patterns located on the fourth wiring unit and the plurality of first switching patterns located on the third wiring unit are of a translation relation in the second direction, and the third switching patterns are insulated from the sub-electrodes.

4. The grating regulating device according to claim 1, wherein the auxiliary line is parallel to the driving lines in the grating region; and/or
the auxiliary line is located between at least two neighboring driving lines; and/or
a plurality of auxiliary lines are located on two opposite sides of the plurality of driving lines; and/or
the plurality of common-signal units comprise neighboring first common-signal unit and second common-signal unit, a plurality of driving lines that are connected to the first common-signal unit are a first wiring unit, a plurality of driving lines that are connected to the second common-signal unit are a second wiring unit, and the auxiliary line is located between the first wiring unit and the second wiring unit.

5. The grating regulating device according to claim 1, wherein the auxiliary line and the driving lines located on one side of the auxiliary line have same patterns in the grating region.

6. The grating regulating device according to claim 1, wherein the auxiliary line is connected to a constant-voltage inputting terminal, and the constant-voltage inputting terminal is for transmitting a constant-voltage signal to the auxiliary line.

7. The grating regulating device according to claim 1, wherein the first electrode layer comprises a first sub-electrode layer, a second insulating layer and a second sub-electrode layer that are arranged in stack, and the first sub-electrode layer is located between the first insulating layer and the second insulating layer;
- the plurality of sub-electrodes include a plurality of first sub-electrodes that are arranged in the first direction, and a plurality of second sub-electrodes that are arranged in the first direction, and orthographic projections of the first sub-electrodes on the first substrate and orthographic projections of the second sub-electrodes on the first substrate are alternately arranged;
- the plurality of first sub-electrodes are located at the first sub-electrode layer, the first sub-electrodes and the driving lines are connected by first via holes provided in the first insulating layer, the plurality of second sub-electrodes are located at the second sub-electrode layer, and the second sub-electrodes and the driving lines are connected by second via holes provided in the first insulating layer and the second insulating layer; and
- each of the first sub-electrodes comprises a bent part, and the bent part is bent toward one side away from the second via hole, to form an avoiding region for avoiding the second via hole.

8. The grating regulating device according to claim 1, wherein the grating regulating device further comprises a non-grating region located on at least one side of the grating region; and
- the plurality of driving lines are located in the non-grating region, and the sub-electrodes extend to the non-grating region, and are connected to the corresponding driving lines by via holes in the non-grating region.

9. The grating regulating device according to claim 8, wherein the plurality of common-signal units comprise a fifth common-signal unit and a sixth common-signal unit, wherein the sixth common-signal unit is any one of the common-signal units that is located on one side of the fifth common-signal unit that is close to the signal inputting terminal; and
- an orthographic projection of the driving line connected to the fifth common-signal unit on the first substrate and an orthographic projection of at least one of the sub-electrodes in the sixth common-signal unit on the first substrate intersect with each other.

10. The grating regulating device according to claim 8, wherein the plurality of common-signal units comprise a seventh common-signal unit and an eighth common-signal unit, wherein the eighth common-signal unit is any one of the plurality of common-signal units other than the seventh common-signal unit; and
- an orthographic projection of the driving line connected to the seventh common-signal unit on the first substrate and orthographic projections of the sub-electrodes in the eighth common-signal unit on the first substrate do not overlap.

11. The grating regulating device according to claim 10, wherein each of the driving lines comprises an extending line and a bending line, an extension direction of the extending line is the first direction, the extending line is connected to the sub-electrodes that are located in a same common-signal unit and have a same serial number by via holes, one end of the bending line is connected to the extending line, the other end of the bending line is connected to the signal inputting terminal, and orthographic projections of the bending lines on the first substrate and orthographic projections of the plurality of sub-electrodes on the first substrate do not overlap.

12. The grating regulating device according to claim 8, wherein a plurality of driving lines that are connected to a same common-signal unit are divided into a first wiring group and a second wiring group, and the first wiring group and the second wiring group are located on two opposite sides of the grating region.

13. The grating regulating device according to claim 12, wherein the plurality of sub-electrodes comprise first sub-electrodes and second sub-electrodes that are alternately arranged in the first direction, the plurality of first sub-electrodes located in the same grating unit are ordered in the first direction, and the plurality of second sub-electrodes located in the same grating unit are ordered in the first direction;
- the first sub-electrodes and the second sub-electrodes whose serial number is an odd number are correspondingly connected to the driving lines in the first wiring group; and
- the first sub-electrodes and the second sub-electrodes whose serial number is an even number are correspondingly connected to the driving lines in the second wiring group.

14. A displaying device, wherein the displaying device comprises a display panel and the grating regulating device according to claim 1, and the grating regulating device is located on a light exiting side or shadow side of the display panel.

15. The displaying device according to claim 14, wherein the display panel comprises a displaying region and a non-displaying region located on at least one side of the displaying region; and
- an orthographic projection of the grating region on a plane where the display panel is located covers the displaying region.

16. The displaying device according to claim 15, wherein in the grating region, a plurality of driving lines are arranged in a second direction, and orthographic projections of the driving lines on the first substrate and orthographic projections of the plurality of sub-electrodes on the first substrate intersect with each other;
- the displaying region comprises a plurality of pixel opening regions that are arranged in an array in a row direction and a column direction, and non-opening regions surrounding the pixel opening regions; and
- in the row direction, the orthographic projections of the driving lines on the plane where the display panel is located are located in areas of the pixel opening regions, or the orthographic projections of the driving lines on the plane where the display panel is located are located in areas of the non-opening regions.

17. A 3D displaying device, wherein the 3D displaying device comprises a display panel and the grating regulating device according to claim 1, and the grating regulating device and the display panel face each other.

18. The 3D displaying device according to claim 17, wherein the 3D displaying device further comprises:
- an eyeball tracking module configured to acquire a watching distance; and
- the grating regulating device is connected to the eyeball tracking module, and is further configured to, according to the watching distance, adjust an opening position and/or an aperture ratio of the grating unit.

* * * * *